US012155607B2

(12) United States Patent
Abotabl et al.

(10) Patent No.: US 12,155,607 B2
(45) Date of Patent: Nov. 26, 2024

(54) TECHNIQUES FOR CYCLIC FREQUENCY HOPPING IN SUB-BAND FULL DUPLEX SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/738,888

(22) Filed: May 6, 2022

(65) Prior Publication Data

US 2023/0361978 A1    Nov. 9, 2023

(51) Int. Cl.
*H04L 5/14*   (2006.01)
*H04L 5/00*   (2006.01)

(52) U.S. Cl.
CPC .............. *H04L 5/14* (2013.01); *H04L 5/0092* (2013.01)

(58) Field of Classification Search
CPC ....... H04L 5/14; H04L 5/0092; H04W 56/001
See application file for complete search history.

(56) References Cited

U.S. PATENT DOCUMENTS

| 2021/0337489 A1 | 10/2021 | Abotabl et al. |
| 2023/0163937 A1* | 5/2023 | Awadin ...................... H04L 5/14 370/329 |
| 2023/0283418 A1* | 9/2023 | Abdelghaffar ........ H04L 5/0094 370/329 |

OTHER PUBLICATIONS

International Search Report and Written Opinion—PCT/US2023/065585—ISA/EPO—Jul. 5, 2023 (2202443WO).

* cited by examiner

*Primary Examiner* — Shukri Taha
(74) *Attorney, Agent, or Firm* — Holland & Hart LLP

(57) ABSTRACT

Methods, systems, and devices for wireless communications are described. A network node may transmit a message to a user equipment (UE) indicating at least a first frequency range for uplink data and a second frequency range for the uplink data. The UE may apply a frequency offset for at least one of the first frequency range or the second frequency range based at least in part on the first frequency range, the second frequency range, or both, overlapping with a downlink portion of a sub band full duplex duration. The UE may transmit, during a first portion of the sub band full duplex duration, the uplink data in the first frequency range, the second frequency range, or a third frequency range based at least in part on applying the frequency offset for at least one of the first frequency range or the second frequency range.

30 Claims, 18 Drawing Sheets

TECHNIQUES FOR CYCLIC FREQUENCY HOPPING IN SUB-BAND FULL DUPLEX SLOTS

FIELD OF TECHNOLOGY

The present disclosure relates to wireless communications, including techniques for cyclic frequency hopping in sub-band full duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some wireless communications systems, a UE and a network node may communicate by performing frequency hopping. However, conventional techniques for frequency hopping may result in self-interference at a device, poor communications efficiency or reliability, and the like.

SUMMARY

The described techniques relate to improved methods, systems, devices, and apparatuses that support techniques for cyclic frequency hopping in sub-band full duplex slots. Generally, devices (e.g., a user equipment (UE), a network node, or both) may apply a frequency offset to a first hop (e.g., a first frequency range), a second hop (e.g., a second frequency range), or both. For example, if the first hop or the second hop occurs in a downlink portion of a sub-band frequency full duplex (SBFD) slot, the devices may apply a difference between the first hop and second hop to the first hop or the second hop cyclically until a threshold is satisfied. In some examples, both hops may fall in a downlink portion and the devices may first find the initial hop location in the uplink portion based on a second slot associated with uplink communications (e.g., the second slot may be configured for uplink communications with the downlink portion), and then apply the offset to the second hop based on a difference between the initial hop and the second hop.

In some examples, the devices may drop the first hop, the second hop, or both. In some cases, the devices may be configured with a threshold distance between frequency ranges (e.g., between hops). In some examples, the network node may transmit control signaling indicating different frequency hops for SBFD slots. The devices applying the frequency offset to the first hop, the second hop or both may result in the devices communicating uplink data in an uplink portion of an SBFD slot, rather than in a downlink portion of the SBFD slot.

A method for wireless communications at a UE is described. The method may include receiving a message indicating at least a first frequency range for uplink data and a second frequency range for the uplink data, applying a frequency offset for at least one of the first frequency range or the second frequency range based on the first frequency range, the second frequency range, or both, overlapping with a downlink portion of a sub band full duplex duration, and transmitting, during a first portion of the sub band full duplex duration, the uplink data in the first frequency range, the second frequency range, or a third frequency range based on applying the frequency offset for at least one of the first frequency range or the second frequency range.

An apparatus for wireless communications at a UE is described. The apparatus may include a processor, memory coupled with the processor, and instructions stored in the memory. The instructions may be executable by the processor to cause the apparatus to receive a message indicating at least a first frequency range for uplink data and a second frequency range for the uplink data, apply a frequency offset for at least one of the first frequency range or the second frequency range based on the first frequency range, the second frequency range, or both, overlapping with a downlink portion of a sub band full duplex duration, and transmit, during a first portion of the sub band full duplex duration, the uplink data in the first frequency range, the second frequency range, or a third frequency range based on applying the frequency offset for at least one of the first frequency range or the second frequency range.

Another apparatus for wireless communications at a UE is described. The apparatus may include means for receiving a message indicating at least a first frequency range for uplink data and a second frequency range for the uplink data, means for applying a frequency offset for at least one of the first frequency range or the second frequency range based on the first frequency range, the second frequency range, or both, overlapping with a downlink portion of a sub band full duplex duration, and means for transmitting, during a first portion of the sub band full duplex duration, the uplink data in the first frequency range, the second frequency range, or a third frequency range based on applying the frequency offset for at least one of the first frequency range or the second frequency range.

A non-transitory computer-readable medium storing code for wireless communications at a UE is described. The code may include instructions executable by a processor to receive a message indicating at least a first frequency range for uplink data and a second frequency range for the uplink data, apply a frequency offset for at least one of the first frequency range or the second frequency range based on the first frequency range, the second frequency range, or both, overlapping with a downlink portion of a sub band full duplex duration, and transmit, during a first portion of the sub band full duplex duration, the uplink data in the first frequency range, the second frequency range, or a third frequency range based on applying the frequency offset for at least one of the first frequency range or the second frequency range.

In some examples of the method, apparatuses, and non-transitory computer-readable medium described herein, applying the frequency offset may include operations, features, means, or instructions for dropping the first frequency range or the second frequency range based on the first frequency range or the second frequency range overlapping with the downlink portion of the sub band full duplex duration.

Some examples of the method, apparatuses, and non-transitory computer-readable medium described herein may further include operations, features, means, or instructions for transmitting the uplink data in the first frequency range or the second frequency range during the sub band full duplex duration based on dropping the first frequency range or the second frequency range.

In some examples of the method, apparatuses, and non-transitory computer-readable medium described herein, applying the frequency offset may include operations, features, means, or instructions for applying a difference between the first frequency range and the second frequency range to the first frequency range, the second frequency range, or both and determining whether the applied difference satisfies a threshold, the threshold indicating that a frequency range associated with applying the difference fails to overlap with the downlink portion of the sub band full duplex duration.

Some examples of the method, apparatuses, and non-transitory computer-readable medium described herein may further include operations, features, means, or instructions for selecting the third frequency range for transmission of the uplink data based on the applied difference satisfying the threshold.

Some examples of the method, apparatuses, and non-transitory computer-readable medium described herein may further include operations, features, means, or instructions for applying a second difference between the first frequency range and the second frequency range to the first frequency range, the second frequency range, or both, based on the applied difference failing to satisfy the threshold.

Some examples of the method, apparatuses, and non-transitory computer-readable medium described herein may further include operations, features, means, or instructions for applying the frequency offset to the second frequency range based on the second frequency range overlapping with the downlink portion of the sub band full duplex duration and applying the frequency offset to the first frequency range based on the first frequency range overlapping with the downlink portion of the sub band full duplex duration.

Some examples of the method, apparatuses, and non-transitory computer-readable medium described herein may further include operations, features, means, or instructions for identifying an initial frequency range for the sub band full duplex duration based on a difference between the first frequency range and an initial index of a duration prior to the sub band full duplex duration, an initial index of the sub band full duplex duration, or both, applying the frequency offset to the second frequency range based on a difference between the initial frequency range and the second frequency range, and transmitting the uplink data in the initial frequency range and the third frequency range based on applying the frequency offset.

Some examples of the method, apparatuses, and non-transitory computer-readable medium described herein may further include operations, features, means, or instructions for determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range and dropping at least the third frequency range based on the applied frequency offset failing to satisfy the threshold distance.

In some examples of the method, apparatuses, and non-transitory computer-readable medium described herein, receiving the message may include operations, features, means, or instructions for receiving the message indicating the third frequency range, a fourth frequency range, or both, for transmission of the uplink data during the sub band full duplex duration.

A method for wireless communications at a network node is described. The method may include transmitting a message indicating at least a first frequency range for uplink data and a second frequency range for the uplink data, applying a frequency offset for at least one of the first frequency range or the second frequency range based on the first frequency range, the second frequency range, or both, overlapping with a downlink portion of a sub band full duplex duration, and receiving, during a first portion of the sub band full duplex duration, the uplink data in the first frequency range, the second frequency range, or a third frequency range based on applying the frequency offset for at least one of the first frequency range or the second frequency range.

An apparatus for wireless communications at a network node is described. The apparatus may include a processor, memory coupled with the processor, and instructions stored in the memory. The instructions may be executable by the processor to cause the apparatus to transmit a message indicating at least a first frequency range for uplink data and a second frequency range for the uplink data, apply a frequency offset for at least one of the first frequency range or the second frequency range based on the first frequency range, the second frequency range, or both, overlapping with a downlink portion of a sub band full duplex duration, and receive, during a first portion of the sub band full duplex duration, the uplink data in the first frequency range, the second frequency range, or a third frequency range based on applying the frequency offset for at least one of the first frequency range or the second frequency range.

Another apparatus for wireless communications at a network node is described. The apparatus may include means for transmitting a message indicating at least a first frequency range for uplink data and a second frequency range for the uplink data, means for applying a frequency offset for at least one of the first frequency range or the second frequency range based on the first frequency range, the second frequency range, or both, overlapping with a downlink portion of a sub band full duplex duration, and means for receiving, during a first portion of the sub band full duplex duration, the uplink data in the first frequency range, the second frequency range, or a third frequency range based on applying the frequency offset for at least one of the first frequency range or the second frequency range.

A non-transitory computer-readable medium storing code for wireless communications at a network node is described. The code may include instructions executable by a processor to transmit a message indicating at least a first frequency range for uplink data and a second frequency range for the uplink data, apply a frequency offset for at least one of the first frequency range or the second frequency range based on the first frequency range, the second frequency range, or both, overlapping with a downlink portion of a sub band full duplex duration, and receive, during a first portion of the sub band full duplex duration, the uplink data in the first frequency range, the second frequency range, or a third frequency range based on applying the frequency offset for at least one of the first frequency range or the second frequency range.

In some examples of the method, apparatuses, and non-transitory computer-readable medium described herein, applying the frequency offset may include operations, features, means, or instructions for dropping the first frequency range or the second frequency range based on the first frequency range or the second frequency range overlapping with the downlink portion of the sub band full duplex duration.

Some examples of the method, apparatuses, and non-transitory computer-readable medium described herein may further include operations, features, means, or instructions for receiving the uplink data in the first frequency range or the second frequency range during the sub band full duplex duration based on dropping the first frequency range or the second frequency range.

In some examples of the method, apparatuses, and non-transitory computer-readable medium described herein, applying the frequency offset may include operations, features, means, or instructions for applying a difference between the first frequency range and the second frequency range to the first frequency range, the second frequency range, or both and determining whether the applied difference satisfies a threshold, the threshold indicating that a frequency range associated with applying the difference fails to overlap with the downlink portion of the sub band full duplex duration.

Some examples of the method, apparatuses, and non-transitory computer-readable medium described herein may further include operations, features, means, or instructions for selecting the third frequency range for transmission of the uplink data based on the applied difference satisfying the threshold.

Some examples of the method, apparatuses, and non-transitory computer-readable medium described herein may further include operations, features, means, or instructions for applying a second difference between the first frequency range and the second frequency range to the first frequency range, the second frequency range, or both, based on the applied difference failing to satisfy the threshold.

Some examples of the method, apparatuses, and non-transitory computer-readable medium described herein may further include operations, features, means, or instructions for applying the frequency offset to the second frequency range based on the second frequency range overlapping with the downlink portion of the sub band full duplex duration and applying the frequency offset to the first frequency range based on the first frequency range overlapping with the downlink portion of the sub band full duplex duration.

Some examples of the method, apparatuses, and non-transitory computer-readable medium described herein may further include operations, features, means, or instructions for identifying an initial frequency range for the sub band full duplex duration based on a difference between the first frequency range and an initial index of a duration prior to the sub band full duplex duration, an initial index of the sub band full duplex duration, or both, applying the frequency offset to the second frequency range based on a difference between the initial frequency range and the second frequency range, and receiving the uplink data in the initial frequency range and the third frequency range based on applying the frequency offset.

Some examples of the method, apparatuses, and non-transitory computer-readable medium described herein may further include operations, features, means, or instructions for determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range and dropping at least the third frequency range based on the applied frequency offset failing to satisfy the threshold distance.

In some examples of the method, apparatuses, and non-transitory computer-readable medium described herein, transmitting the message may include operations, features, means, or instructions for transmitting the message indicating the third frequency range, a fourth frequency range, or both, for transmission of the uplink data during the sub band full duplex duration.

DETAILED DESCRIPTION

Figure 1:
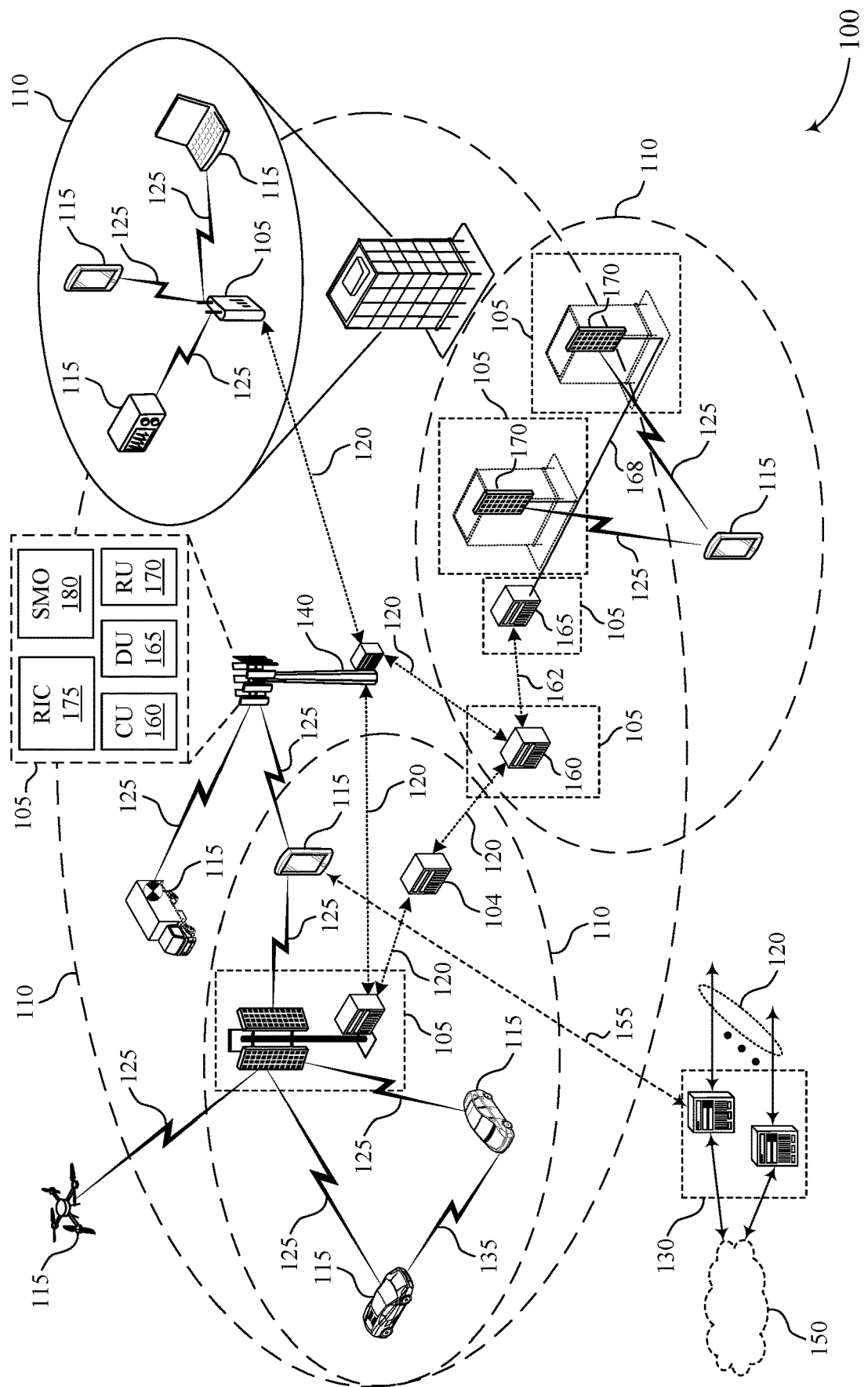
FIG. 1 illustrates an example of a wireless communications system that supports techniques for cyclic frequency hopping in sub-band full duplex slots in accordance with one or more aspects of the present disclosure.

In some wireless communications systems, a network node may communicate with a user equipment (UE) using full duplex communications (e.g., concurrent uplink and downlink communications may be performed within a same time resource, such as a slot, a set of symbol periods, and the like) or half duplex communications (e.g., uplink or downlink are performed within a same time resource). For example, in a sub-band full duplex (SBFD) slot, uplink and downlink transmissions may share time resources but may have different frequency allocations in the SBFD slot. Stated alternatively, the SBFD slot may include an uplink portion and a downlink portion for full duplex communications in the SBFD slot.

In some examples, the wireless communications system may support frequency hopping, such that devices may communicate portions of a transmission on different frequencies of a time duration (e.g., a slot), which may result in frequency diversity and improve communications reliability. In frequency hopping, the UE may transmit a first portion of an physical resource block (PRB) in a first frequency portion of a slot (e.g., a first hop) and a second portion of a PRB in a second frequency portion of a slot (e.g., a second hop). The first hop and the second hop may be associated with an uplink transmission associated with an uplink slot. However, performing frequency hopping may result in a UE being configured to send the uplink transmission in a downlink portion of an SBFD slot. For example, the first hop, the second hop, or both may be configured such that they are scheduled in the downlink portion of the SBFD slot, instead of the uplink portion of the SBFD slot, which may result in self-interference at the UE, poor communications efficiency or reliability, or increased latency at the UE.

Accordingly, the techniques described herein may provide for applying a frequency offset to the first hop, the second hop, or both. For example, if the second hop occurs in a downlink portion of the SBFD slot, devices (e.g., a UE, a network node) may apply a difference between the first hop and second hop to the second hop cyclically, for example, until a threshold is satisfied (e.g., the second hop with the applied one or more differences is located within the uplink portion of the SBFD slot). Additionally or alternatively, if the first hop occurs in the downlink portion, the devices may apply the difference to the first hop cyclically (e.g., one or more instances of applying the difference until a threshold is satisfied). In some examples, both hops may fall in a downlink portion and the devices may first find the initial hop location in the uplink portion based on a second slot associated with uplink communications (e.g., the second slot may be configured for uplink communications), and then apply the offset to the second hop as described herein.

In some examples, applying the frequency offset may include dropping the first hop, the second hop, or both. In some cases, the devices may be configured with a threshold distance between frequency ranges (e.g., between hops). In some examples, a network node may transmit control signaling indicating different frequency hops for SBFD slots. The devices applying the frequency offset to the first hop, the second hop or both may result in the devices communicating uplink data in an uplink portion of an SBFD slot, rather than in a downlink portion of the SBFD slot, which may result in increased efficiency and decreased latency, among other potential benefits.

Aspects of the disclosure are initially described in the context of wireless communications systems. Aspects of the disclosure are illustrated and described by frequency hopping schemes and a process flow. Aspects of the disclosure are further illustrated by and described with reference to apparatus diagrams, system diagrams, and flowcharts that relate to techniques for cyclic frequency hopping in sub-band full duplex slots.

FIG. 1 illustrates an example of a wireless communications system 100 that supports techniques for cyclic frequency hopping in sub-band full duplex slots in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network node 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for cyclic frequency hopping in sub-band full duplex slots as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network node 105 to a UE 115, uplink transmissions (e.g., return link transmissions) from a UE 115 to a network node 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network node 105 may provide communication coverage via one or more cells, for example a macro cell, a small cell, a hot spot, or other types of cells, or any combination thereof. The term "cell" may refer to a logical communication entity used for communication with a network node 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network node 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network node 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network node 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by or scheduled by the network node 105. In some examples, one or more UEs 115 in such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without the involvement of a network node 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located in diverse geographic locations. A network node 105 may have an antenna array with a set of rows and columns of antenna ports that the network node 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more subbands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network node 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, the UE 115 and the network node 105 may communicate according to a full duplex configuration, where a first transmission and a second transmission may occur at a same time resource. For example, a device (e.g., the UE 115, the network node 105) may transmit signals and receive signals concurrently (e.g., in a same time duration such as a slot or other duration). In some cases, the network node 105 and the UE 115 may additionally or alternatively communicate according to a half-duplex configuration, where a device may transmit a signal on a time resource or alternatively receive a signal on the time resource. In full duplex configurations, there may be two types of slots that support uplink transmission, such as uplink slots (e.g., a half-duplex uplink slot that may support uplink transmissions but not downlink transmissions) and a sub-band full duplex (SBFD) slot, which may support both uplink and downlink transmissions. For example, in an uplink slot, a full frequency range associated with the slot may be associated with uplink transmission and may be regulated by an uplink bandwidth part (BWP). In another example, in an SBFD slot, uplink and downlink transmissions may share time resources but may have different frequency allocations in the SBFD slot. In some examples, a relatively small portion of the SBFD slot (e.g., a limited uplink band) may be associated with (e.g., used for) uplink transmission while a downlink portion of the SBFD slot may be relatively large.

In some examples, the wireless communications system 100 may support frequency hopping. Frequency hopping may be an example of a device communicating portions of a transmission on different frequencies to obtain frequency diversity and improve communications reliability. For example, a device may be configured with a quantity of hops (e.g., switching from transmitting on a first frequency range to a second frequency range in a time duration such as a slot). Hops may additionally or alternatively be examples of or referred to as frequency ranges, portions of a frequency band, and the like. Frequency hopping may be enabled for certain formats of an physical uplink control channel (PUCCH) associated with an OFDM signal length and a quantity of bits (e.g., hopping for formats 1, 3, and 4 of a physical uplink control channel message may be enabled, hopping with two symbols may be enabled with formats 0 and 2). In some examples, a quantity of symbols in a first hop may be a "floor" (e.g., a total quantity of PUCCH symbols divided by 2), the location of the hops may be flexible or follow a mirror map, or a combination thereof. As an illustrative example, a PUCCH may support multiple formats (e.g., PUCCH format 0, 1, 2, 3, and 4) which may each be associated with a length in OFDM symbols and a quantity of bits. Intra-slot frequency hopping may be configured to some of the formats (e.g., 1, 3, or 4) and the quantity of symbols in the first hop (e.g., to be transmitted in a first frequency range) may be signaled or pre-configured at a device for each format.

In some examples, the UE 115 may be provided by higher layers with one or more PUCCH resources. A PUCCH resource may include one or more parameters, including a PUCCH resource index provided by PUCCH-ResourceID, an index of the first PRB prior to frequency hopping or for no frequency hopping by startingPRB, if a UE is not provided useInterlacePUCCH-PUSCH in BWP-UplinkDedicated field, an indication for intra-slot frequency hopping by intraSlotFrequencyHopping field, an index of a first interlace provided by interlace0 field, if a UE is provided useInterlavePUCCH-PUSCH in BWP-Uplink dedicated, an index of a resource block (RB) set by rb-SetIndex field, a configuration for a PUCCH format provided by format field, or any combination thereof.

As an example, intra-slot frequency hopping in the PUCCH may be supported in cases where the PUCCH is associated with a specific range of OFDM symbols (e.g., 4-14 OFDM symbols), which may allow for flexibility in frequency hopping. The UE may perform frequency hopping (e.g., frequency hop) by transmitting a first portion of an physical resource block (PRB) in a first frequency portion of a slot (e.g., a first hop) and a second portion of a PRB in a second frequency portion of a slot (e.g., a second hop). The first hop and the second hop may be associated with an uplink transmission intended for an uplink slot. However, performing frequency hopping may result in a UE transmitting the first hop, the second hop, or both in the downlink portion of the SBFD slot, instead of the uplink portion of the SBFD slot, due to the small portion of the SBFD slot associated with uplink transmission. For example, the first hop and the second hop may be configured for an uplink slot but may result in an uplink transmission on a downlink portion of an SBFD slot. Stated alternatively, the devices performing frequency hopping with a configured first hop, second hop, or both in the downlink portion of the SBFD slot may result in self-interference, poor communications efficiency or reliability, or increased latency.

Techniques are described herein for applying a frequency offset to the first hop, the second hop, or both. For example, a device (e.g., a UE 115 or a network node 105 or both) may be configured to drop one or more uplink hops that overlap with a downlink portion of a slot (e.g., an applied offset may result in a hop being moved such that the frequency range of the hop has the same frequency range of another hop that is located within the uplink portion of the slot), the device may be configured to apply one or more offsets in a cyclical manner to hops lying outside a correct portion (e.g., until a threshold is satisfied associated with the hop being offset to fall within an uplink portion), or a combination thereof. As an illustrative example, if the second hop occurs in a downlink portion of the SBFD slot, a device may apply a difference between the first hop and second hop to the second hop cyclically (e.g., until the second hop with the applied differences lies within the uplink portion of the SBFD slot). If the first hop occurs in the downlink portion, the device may apply the differences to the first hop cyclically. In some examples, both hops may fall in a downlink portion and the device may first find the initial hop location in the uplink portion based on a second slot associated with uplink communications (e.g., the second slot may be configured for uplink communications with the downlink portion), and then apply the offset to the second hop cyclically until both hops fall within the uplink portion.

In some cases, the device may be configured with a threshold distance between frequency ranges (e.g., between hops) by the network node. For example, if an applied offset results in a hop that is relatively close to another hop (e.g., less than the threshold distance in frequency) then the device may drop the hop or continue to apply an offset until a frequency range that satisfies (e.g., is greater than) the threshold distance is obtained. In some examples, the network node may transmit control signaling indicating different frequency hops for SBFD slots. For example, the control signaling may indicate frequency hops for uplink slots (e.g., legacy uplink slots that do not support downlink communications) and frequency hops for SBFD slots. Such techniques may result in the devices communicating uplink data in an uplink portion of an SBFD slot, rather than in a downlink portion of the SBFD slot, which may result in increased efficiency and decreased latency, among other benefits.

Although described herein with reference to two uplink hops and a slot for illustrative clarity, it is to be understood the techniques described herein may be applied for any quantity or types of hops (e.g., downlink hops overlapping with an uplink portion), any quantity of types of slots or other time durations, or a combination thereof.

Figure 2:
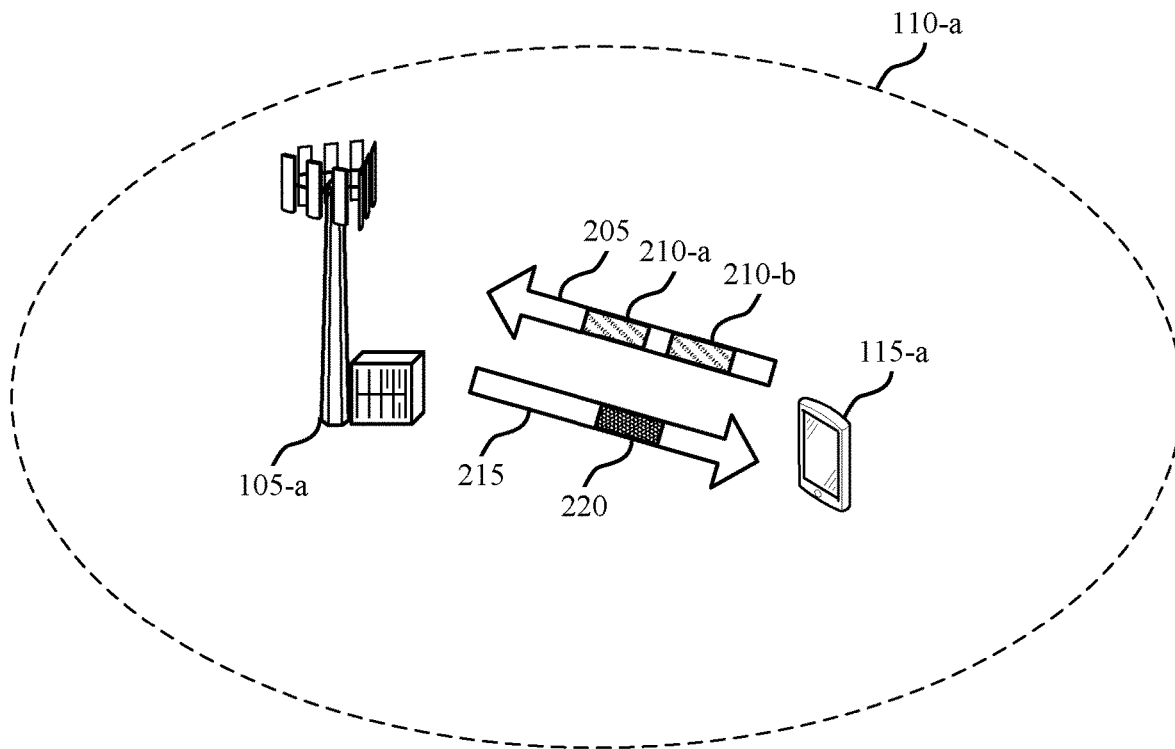
FIG. 2 illustrates an example of a wireless communications system that supports techniques for cyclic frequency hopping in sub-band full duplex slots in accordance with one or more aspects of the present disclosure.
Figure 2:
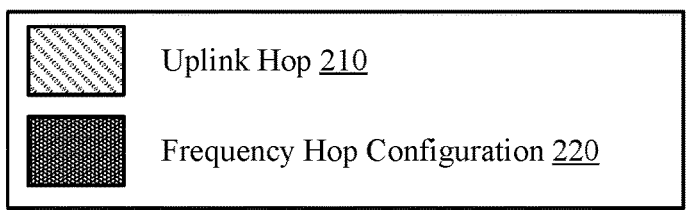

FIG. 2 illustrates an example of a wireless communications system 200 that supports techniques for cyclic frequency hopping in sub-band full duplex slots in accordance with one or more aspects of the present disclosure. In some examples, wireless communications system 200 may implement aspects of wireless communications system 100 and may include a UE 115-*a* and a network node 105-*a* with a coverage area 110-*a*, which may be examples of a UE 115 and a network node 105 with a coverage area 110 as described with reference to FIG. 1. The network node 105-*a* and the UE 115-*a* may communicate with one another via a communication link 205 and a communication link 215. For example, the communication link 205 may be an example of an uplink communication link and the communication link 215 may be an example of a downlink communication link.

The network node 105-*a* and the UE 115-*a* may communicate with one another according to a full-duplex configuration. For example, the network node 105-*a* may transmit a downlink signal (e.g., via the communication link 215) to the UE 115-*a* while receiving (e.g., via the communication link 205) an uplink signal from the UE 115-*a*. Additionally, or alternatively, the UE 115-*a* may receive (e.g., via the communication link 215) the downlink signal from the network node 105-*a* while transmitting (e.g., via the communication link 215) the uplink signal to the network node 105-*a*. In some examples, the UE 115-*a* and the network node 105-*a* may operate using SBFD slots (e.g., as described with reference to FIG. 1), in which the UE 115-*a* and the network node 105-*a* may transmit and receive messages in a same time resource, but different frequency resources. Thus, the downlink resources may be separated from the uplink resource in the frequency domain, as described in more detail with reference to FIG. 3.

The network node 105-*a* may transmit configuration information, data, or both, to the UE 115-*a* via the communication link 215. The communication link 215 may be an example of a link used to carry a physical downlink control channel (PDCCH) (e.g., used to transmit control information) or a physical downlink shared channel (PDSCH) (e.g., used to transmit data). For example, the network node 105-*a* may transmit a frequency hop configuration 220 to the UE 115-*a* to indicate a frequency range of a first hop 210-*a* of a PRB and a frequency range of a second hop 210-*b* of the PRB. Based on the frequency hop configuration 220, the UE 115-*a* may transmit (e.g., perform frequency-hopping on) the first hop 210-*b* and the second hop 210-*b* during a portion of the SBFD slot. However, in some examples, performing frequency hopping may result in the UE 115-*a* transmitting the first hop 210-*a*, the second hop 210-*b*, or both in the downlink portion of the SBFD slot, instead of the uplink portion of the SBFD slot, which may result in self-interference, poor communications efficiency or reliability, or increased latency at the UE 115-*a*.

As described herein, the wireless communications system 200 may support the use of techniques that enable for the UE 115-*a*, the network node 105-*a*, or both to apply a frequency offset to the first hop 210-*a*, the second hop 210-*b*, or both if the respective frequency hops 210 are configured to be transmitted during the downlink portion of the SBFD slot. In some examples, the network node 105-*a* may configure a frequency offset for the first hop (e.g., a third frequency range), a frequency offset for the second hop (e.g., a fourth frequency range), or both via the communication link 215. In some examples, the UE 115-*a* may apply a frequency offset to the first hop 210-*a*, the second hop 210-*b*, or both, based on whether the frequency hops are configured to be transmitted in the downlink portion of the SBFD slot. The UE 115-*a* may determine the frequency offset by computing a difference between the first hop 210-*a* and the second hop 210-*b*, a difference between the first hop 210-*a* and a first resource block index (e.g., a difference between the starting resource block index of an uplink slots that does not support full duplex communications and a starting physical resource block index of the SBFD slot), or both. Applying the frequency offset may result in decreased latency and increased reliability because the frequency hops 210 may remain the uplink portion of the SBFD slot as a result of the frequency offset. In some examples, applying a frequency offset may refer to or be an example of dropping a hop 210 for a downlink portion and transmitting the uplink transmission on a different hop 210 that is within the uplink portion.

In some examples, the network node 105-*b* may configure the UE 115-*a* with a threshold distance (e.g., minimum distance between frequency ranges) for the first hop 210-*a* and the second hop 210-*b*. The devices may determine whether the computed difference satisfies the threshold, and the devices may refrain from performing frequency hopping if the difference fails to satisfy the threshold (e.g., the devices may drop the hop that, after applying a frequency offset, fails to satisfy the threshold). As an illustrative example, such as when the devices disable frequency hopping, the devices may communicate all of the symbols in the PRB in the first hop 210-*a* (e.g., if the second hop 210-*a* falls in a downlink portion of the slot).

Figure 3:
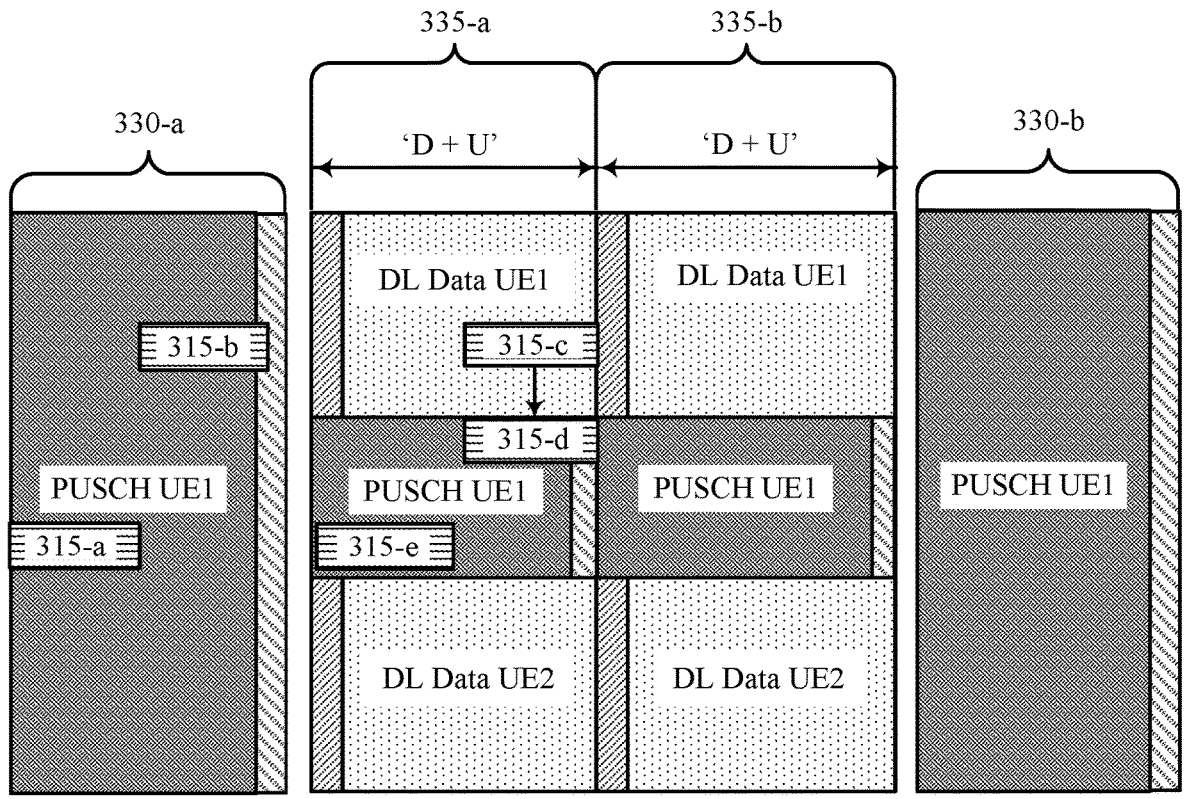
FIG. 3 illustrates an example of a frequency hopping scheme that supports techniques for cyclic frequency hopping in sub-band full duplex slots in accordance with one or more aspects of the present disclosure.
Figure 3:
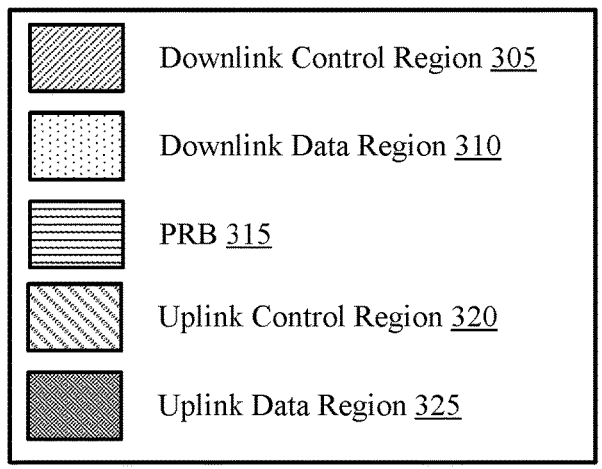

FIG. 3 illustrates an example of a frequency hopping scheme 300 that supports techniques for cyclic frequency hopping in sub-band full duplex slots in accordance with one or more aspects of the present disclosure. In some examples, the frequency hopping scheme 300 may implement aspects of wireless communications systems 100 and 200. For example, a UE (e.g., a UE 115 as described with reference to FIG. 1 and FIG. 2, a network node 105 as described with reference to FIG. 1 and FIG. 2, or both) may implement the frequency hopping scheme 300 for full-duplex communications. The frequency hopping scheme 300 may represent a set of time and frequency resources for communication between the UE 115 and the network node 105.

The frequency hopping scheme 300 may include, for example, one or more slots 330 (e.g., slot 330-*a* and slot 330-*b*) and slots 335 (e.g., slot 335-*a* and slot 335-*b*). Slots 330 may include an uplink portion (e.g., uplink data region 325) for uplink transmissions from a UE to a network node, from a network node to another network node, and the like as described herein with reference to FIG. 1. Slots 335 may include the uplink data region 325 and a downlink portion (e.g., downlink data region 310) of one or more uplink transmissions and one or more downlink transmissions, respectively. For example, the slots 335 may be examples of SBFD slots as described herein, which may support concurrent uplink communications (e.g., in uplink portions 320 and 325) and downlink communications (e.g., downlink portions 305 and 310) in the same slot. In some examples, uplink and downlink portions may additionally or alternatively be referred to as regions, subbands, and the like. The PRBs 315 may be examples of resources allocated for an uplink transmission in accordance with a frequency hopping configuration.

Each slot 330 and each slot 335 may include a respective resource allocation in the frequency domain. For instance, a slot 335 may include a number of resource blocks (e.g., PRBs 315). In some examples, one or more slots 335 may be associated with a frequency hopping pattern (e.g., inter-slot frequency hopping, intra-slot frequency hopping). In such examples, transmissions may vary in frequency within a slot 335 or across slots 335 (e.g., one or more frequency ranges may be used for transmissions in or across the slots). Each slot 330 and slot 335 may be configured according to a communication type. For example, slots 330-*a* and 330-*b* may be configured for half-duplex communications (e.g., communications in either the uplink direction or the downlink direction), where slot 330-*a* and slot 330-*b* may include an uplink control region 320 and an uplink data transmission (e.g., a physical uplink shared channel (PUSCH) transmission via PRBs 315) in uplink data region 325. In another example, slots 335-*a* and 335-*b* may be configured for full-duplex communications (e.g., supporting simultaneous communications in both uplink and downlink directions). For example, slot 335-*a* and slot 335-*b* may include the downlink control region 305, corresponding downlink data regions 310, uplink control regions 320, and corresponding uplink data regions 325. Such a duration that supports both uplink and downlink communications may be denoted as 'D+U' in the example of FIG. 3.

The UE 115 may perform frequency hopping by transmitting a first hop and a second hop. For example, the UE 115 may transmit a first portion of an uplink transmission on PRB 315-*a* and a second portion of the uplink transmission on PRB 315-*b* in the uplink data region 325 of slot 330-*a*. In some examples, the locations of the PRBs 315 (e.g., the hops, frequency ranges) may be configured via control signaling from the network node 105. For example, the network node 105 may indicate the frequency hopping configuration in a PUCCH message as described herein with reference to FIGS. 1 and 2. In some examples, the PRB 315-*e* may be referred to as a starting PRB 315 for the slot 335-*a* and the PRB 315-*c* may be referred to as a second hop PRB 315 for the slot 335-*a* (e.g., prior to applying an offset as described herein).

However, in some examples the frequency hopping configuration for the slots 330 may result in inefficient communications or self-interference in the slots 335. For example, the UE 115 may be configured to send an uplink PRB 315-*c* in the downlink data region 310 of the slot 335-*a* (e.g., due to the frequency range indicated as the same for PRB 315-*b* in the slot 330-*a*). Stated alternatively, PRB 315-*c*, PRB 315-*e*, or both may be configured such that they are scheduled in the downlink data region 310 of the slot 335-*a*, instead of the uplink data region 325. In this example (e.g., frequency hopping scheme 300), PRB 315-*c* (e.g., the second hop) may occur in the downlink data region 310 of the slot 335-*a*.

In accordance with the techniques described herein, devices may apply an offset to the hops in the downlink data region 310 (e.g., downlink portion) of the slots 335-*a*. For example, the PRB 315-*c* may occur in a downlink data region 310 of the slot 335-*a*, and the devices may apply a difference (e.g., an offset) to obtain another frequency range (e.g., a third frequency range for the PRB 315-*d*) that satisfies a threshold (e.g., lies in the uplink data region 325). In some examples, the devices may determine a difference between the scheduled PRBs 315 (e.g., a difference in frequency or indices of the PRBs 315-*e* and 315-*c*) and use the difference as the offset to apply in either the positive or negative direction. Stated alternatively, the UE 115 may apply the difference between a starting PRB 315 and a second hop PRB 315 in a cyclic manner to one or both PRBs 315 to stay in an uplink subband.

The devices may apply the offset cyclically until a threshold is satisfied. For example, the devices may apply the offset to the PRB 315-*c* (e.g., applied one or more times) until the PRB 315-*c* is located within the uplink data region 325 (e.g., PRB 315-*d*). If the threshold is not satisfied, the difference may be applied again until the threshold is satisfied (e.g., the PRB 315-*c* adjusted by the offset is within the uplink portion). If the application of the difference extends past the band, the location of the resulting PRB may cycle. For example, if the difference is applied in a positive direction, rather than the resulting frequency range being located above the band illustrated in FIG. 3, the frequency range may cycle to the bottom of the band in FIG. 3, and vice versa if the difference is applied in a negative direction. Such cycling may be an example of applying an offset cyclically (e.g., in a cyclic manner).

In some examples, the UE 115 may drop the PRB 315-*c*. Stated alternatively, the UE 115 may disable frequency hopping for one or more PRBs 315 and may transmit the uplink information in the frequency range of the PRB 315-*e* (e.g., the frequency hop initially located within the uplink data region 325) for the duration of the slot 335-*a*.

In some examples, by configuring the devices to apply a frequency offset (e.g., drop the PRB 315-*c* hop, shift it cyclically to the uplink data region 325), the devices may be enabled to identify the PRB 315-*d* frequency range for communications without signaling, which may result in reliable communications (e.g., reduced likelihood of self-interference at either device due to communicating uplink data in the downlink data region 310), relatively low signaling overhead, or both. Additionally or alternatively, the devices may be configured with both a hopping configuration for slots 330 and a second hopping configuration for slots 335. For example, the hops for uplink slots 330 may have a first configuration and the message configurating the first configuration or another message may indicate a second configuration for hops in the slots 335 (e.g., the frequency ranges of the PRBs 315-*e* and 315-d or other frequency ranges may be indicated by the second configuration), which may provide scheduling flexibility, among other benefits.

In some cases, the devices may be configured with a threshold distance between frequency ranges (e.g., between hops). For example, a network node may indicate the threshold in a message or the devices may be pre-configured with the threshold. In some examples, if the difference between the PRB 315-*d* (resulting from one or more applications of the offset to the PRB 315-*c*) and the PRB 315-*e* fails to satisfy the threshold distance (e.g., the frequency ranges are relatively close together), the devices may drop the PRB 315-*d* (e.g., disable hopping and transmit the uplink transmission in the frequency range of the PRB 315-*e*). In some examples, aspects of the frequency hopping scheme may implement or be implemented by aspects of any of the wireless communications systems, frequency hopping schemes, and process flows described herein.

Although described herein with reference to two uplink hops for illustrative clarity, it is to be understood the techniques described herein may be applied for any quantity or types of hops (e.g., downlink hops overlapping with an uplink portion), any quantity of types of slots or other time durations, or a combination thereof. For example, a downlink hop falling in the uplink portions of the SBFD slots 335 may be shifted as described herein to the downlink portions. Further, operations described as being performed by a UE 115 may additionally or alternatively be performed by a network node 105, and vice versa.

Figure 4:
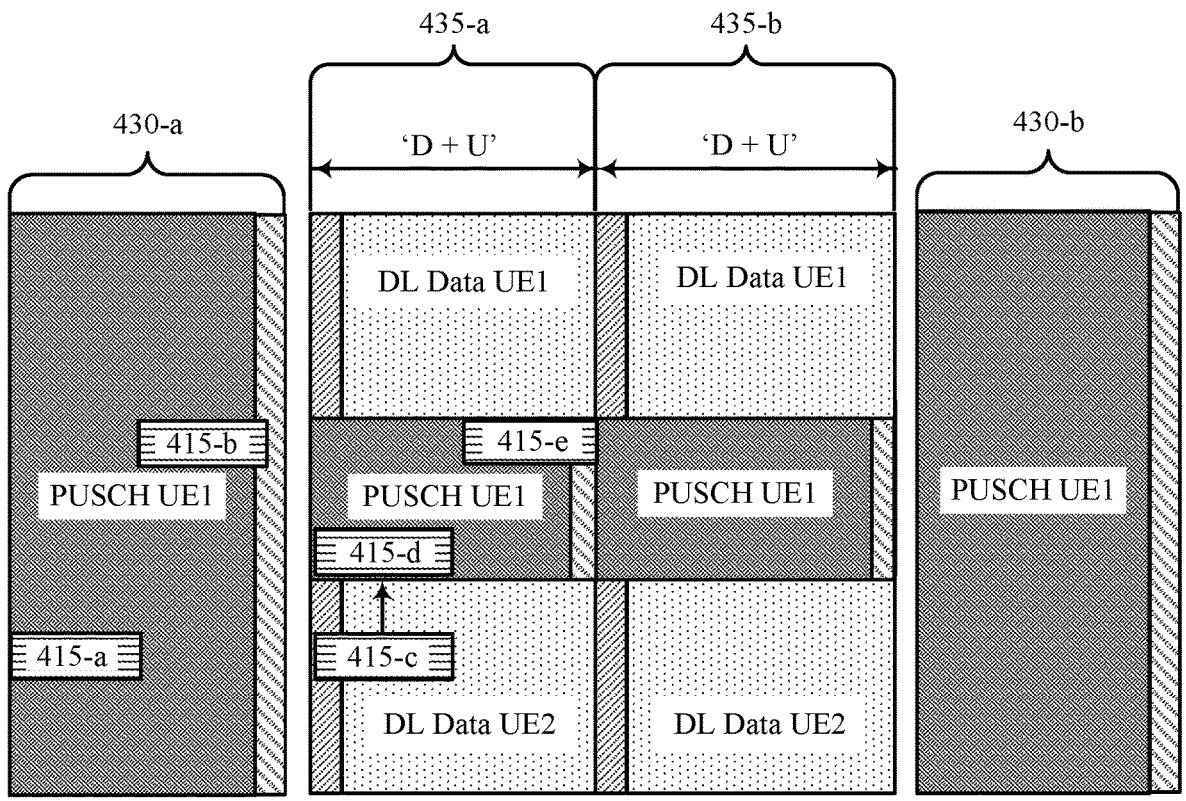
FIG. 4 illustrates an example of a frequency hopping scheme that supports techniques for cyclic frequency hopping in sub-band full duplex slots in accordance with one or more aspects of the present disclosure.

FIG. 4 illustrates an example of a frequency hopping scheme 400 that supports techniques for cyclic frequency hopping in sub-band full duplex slots in accordance with one or more aspects of the present disclosure. In some examples, the frequency hopping scheme 400 may implement or be implemented by aspects of wireless communications systems 100 and 200, the frequency hopping scheme 300, or a combination thereof. For example, devices (e.g., a UE 115 as described with reference to FIG. 1 and FIG. 2, a network node 105 as described with reference to FIG. 1 and FIG. 2, or both) may implement a frequency hopping scheme 400 for full-duplex communications. The frequency hopping scheme 400 may represent a set of time and frequency resources for communication between the UE 115 and the network node 105.

The frequency hopping scheme 400 may implement or be implemented by aspects of frequency hopping scheme 300. For example, the frequency hopping scheme 400 may include one more or more slots 430 (e.g., slots 330 as described with reference to FIG. 3) and slots 435 (e.g., slots 330 as described with reference to FIG. 3). Slots 430 may be associated with an uplink data region 425 for uplink transmissions. Slots 435 may be associated with the uplink data region 425 (e.g., uplink data region 325 as described with reference to FIG. 3) and a downlink data region 410 (e.g., downlink data region 310 as described with reference to FIG. 3) of one or more uplink transmissions and one or more downlink transmissions. The downlink transmissions may include downlink control regions 405 (e.g., downlink control region 305 as described with reference to FIG. 3). Similarly, the uplink transmissions may include uplink control regions 320 (e.g., uplink control region 320 as described with reference to FIG. 3). Downlink control region 405 and uplink control region 420 may include resources allocated in the time domain and resources allocated in the frequency domain. The uplink transmissions may be associated with PRBs 415 (e.g., PRBs 315 as described with reference to FIG. 3).

The UE 115 may perform frequency hopping by transmitting a first uplink PRB 415 and a second uplink PRB 415 (e.g., hops). For example, the UE 115 may transmit PRB 415-*a* and PRB 415-*b* in the uplink data region 425 of slot 430-*a*. Additionally or alternatively, the UE 115 may be configured to perform frequency hopping to transmit PRB 415-*c* and PRB 415-*e* in the slot 435-*b*. In some examples, the UE 115 may be configured to send an uplink PRB 415 in the downlink data region 410 of the slot 435-*a*. In this example, PRB 415-*c* (e.g., the first hop) may occur in the downlink data region 410 of the slot 445-*a*, instead of the uplink data region 425.

Accordingly, if the PRB 415-*c* occurs in a downlink data region 410 of the slot 435-*a*, the UE 115 may apply a difference (e.g., a negative offset or a positive offset) by determining the difference between the PRB 415-*e* and PRB 415-*c*. The UE 115 may apply the negative offset cyclically until a threshold is satisfied. For example, the UE 115 may apply the negative offset to the PRB 415-*c* (e.g., applied one or more times) until the PRB 415-*c* is located within the uplink data region 425 (e.g., PRB 415-*d*). In some examples, the UE 115 may drop the PRB 415-*c*. The UE 115 may disable frequency hopping and may transmit the uplink information in PRB 415-*e* (e.g., the frequency hop initially located within the uplink data region 425).

In some cases, the UE 115 may be configured with a threshold distance between hops by the network node 105. In some examples, the network node 105 may transmit control signaling indicating different frequency hops for slots 435. The UE 115 applying the frequency offset to the PRB 415-*c* (e.g., the first hop) may result in the UE 115 communicating uplink data in an uplink data region 425 of the slot 435-*a*, rather than in the downlink data region 410 of the slot 435-*a*.

Figure 5:
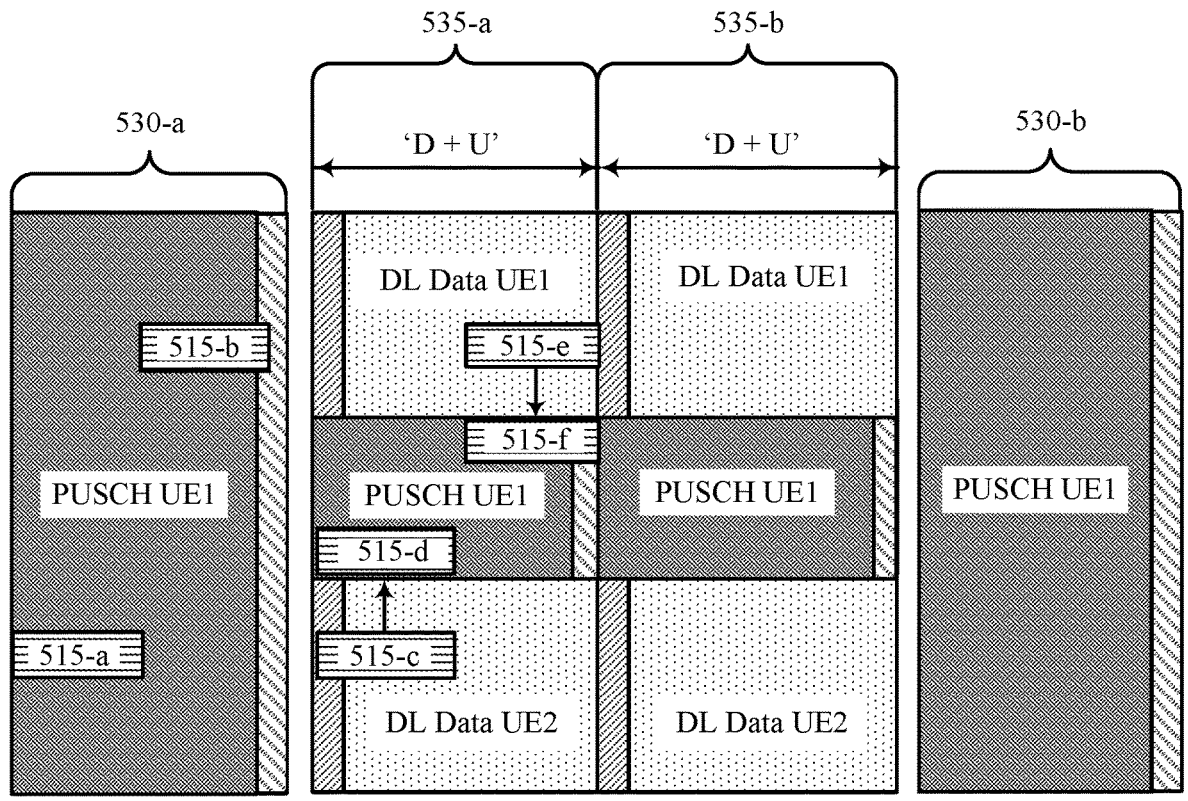
FIG. 5 illustrates an example of a frequency hopping scheme that supports techniques for cyclic frequency hopping in sub-band full duplex slots in accordance with one or more aspects of the present disclosure.

FIG. 5 illustrates an example of a frequency hopping scheme 500 that supports techniques for cyclic frequency hopping in sub-band full duplex slots in accordance with one or more aspects of the present disclosure. In some examples, the frequency hopping scheme 500 may implement or be implemented by aspects of wireless communications systems 100 and 200, the frequency hopping schemes 300 and 400, or a combination thereof. For example, devices (e.g., a UE 115 as described with reference to FIG. 1 and FIG. 2, a network node 105 as described with reference to FIG. 1 and FIG. 2, or both) may implement a frequency hopping scheme 500 for full-duplex communications. The frequency hopping scheme 500 may represent a set of time and frequency resources for communication between the UE 115 and the network node 105.

The frequency hopping scheme 500 may implement aspects of frequency hopping schemes 300 and 400. For example, the frequency hopping scheme 500 may include one more or more slots 530 (e.g., slots 330 and 430 as described with reference to FIG. 3 and FIG. 4) and slots 535 (e e.g., slots 330 and 430 as described with reference to FIG. 3 and FIG. 4). Slots 530 may be associated with an uplink data region 525 for uplink transmissions. Slots 535 may be associated with the uplink data region 525 (e.g., uplink data regions 325 and 425 as described with reference to FIG. 3 and FIG. 4) and a downlink data region 510 (e.g., downlink data regions 310 and 410 as described with reference to FIG. 3 and FIG. 4) of one or more uplink transmissions and one or more downlink transmissions. The downlink transmissions may include downlink control regions 505 (e.g., downlink control regions 305 and 405 as described with reference to FIG. 3 and FIG. 4). Similarly, the uplink transmissions may include uplink control regions 520 (e.g., uplink control regions 320 and 420 as described with reference to FIG. 3 and FIG. 4). Downlink control region 505 and uplink control region 520 may include resources allocated in the time domain and resources allocated in the frequency domain. The uplink transmissions may be associated with PRBs 515 (e.g., PRBs 315 and 415 as described with reference to FIG. 3 and FIG. 4).

The UE 115 may perform frequency hopping by transmitting a first uplink PRB 515 (e.g., a first hop) and a second uplink PRB 515 (e.g., a second hop) on the SBFD slots 535 and uplink slots 530. The UE 115 may transmit PRB 515-*a* and PRB 515-*b* in the uplink data region 525 of slot 530-*a*. In some examples, the UE 115 may be configured to send both uplink PRBs 515 in the downlink data region 510 of the slot 435-*a* (e.g., the hop configuration for slots 530 may result in a hop of the slots 535 occurring in the downlink portion). In this example, PRB 515-*c* (e.g., the first hop) and PRB 515-*e* (e.g., the second hop) may both occur in the downlink data region 510 of the slot 535-*a*, instead of the uplink data region 525. That is, both of the hops may occur outside of the uplink portion in the example of FIG. 5.

Accordingly, the devices may be configured to apply an offset (e.g., drop one or more PRBs, shift one or more PRBs, or both) as described herein. For example, if the PRB 515-*c* and the PRB 515-*e* are scheduled to occur in a downlink data region 510 of the slot 535-*a*, the UE 115 may identify a new location for the first hop that falls within an uplink portion (e.g., the PRB 515-*d*) and apply a difference cyclically to the second hop (e.g., PRB 515-*e*) to drop the PRB 515-*e* or obtain the PRB 515-*f* as described herein.

As an illustrative example, the UE 115 may identify an initial frequency range for the slot 535-*a* (e.g., the first hop of the SBFD slot 535-*a*) using one or more block indexes. For instance, the UE 115 may determine a difference between the starting PRB index of the slot 535-*a* (e.g., a first index, an initial index of the uplink data region 525) and starting PRB index of the slot 530-*a* (e.g., a first index, an initial index of the uplink data region 525 in the slot 530-*a*). Such indices may be examples of or correspond to a frequency range in the band or subband. The UE 115 may apply (e.g., add or subtract) the difference to the first resource block index in the slot 535-*a* in a cyclic manner as described herein (e.g., until a threshold is satisfied and, as an example, the PRB 515-*d* is obtained). As an illustrative example, the UE 115 may use Equation 1 to obtain the initial hop for the slot 535-*a*:

Starting.PRB.SBFD=mod(first.PRB.SBFD.slot+
(starting.PRB.legacy−first.PRB.legacy.slot),
N.SBFD)   (1)

In Equation 1, Starting.PRB.SBFD may represent the initial PRB 515 for the SBFD slot 535-*a* (e.g., the PRB 515-*d* for the first hop as a result of Equation 1), first-.PRB.SBFD.slot may represent the first PRB 515-*c* hop of the slot 535-*a* prior to applying an offset, starting.PRB.legacy may represent an initial PRB 515 of the slot 530-*a* (e.g., a first index of the band of the slot 530-*a*), first.PRB.legacy.slot may represent the first PRB 515-*a* of the first hop of the slot 530-*a* having a slot type different (e.g., a legacy slot type) than the slot 535-*a*, and N.SBFD may represent a total quantity of PRBs 515 in the slot 535-*a* (e.g., a quantity of PRB indices for the whole band, the uplink portion of the slot 535-*a*).

Additionally or alternatively, the UE 115 may apply an offset to PRB 515-*e* (e.g., the second hop) by determining the difference between the PRB 515-*d* and the PRB 515-*e*. The UE 115 may apply the offset cyclically until a threshold is satisfied. For example, the UE 115 may apply the offset to the PRB 515-*e* until the PRB 515-*e* is located within the uplink data region 525 (e.g., PRB 515-*f*). In some examples, the UE 115 may drop the PRB 515-*c* and the PRB 515-*e*. Stated alternatively, to find the second hop PRB 515-*f*, the UE 115 may apply the second hop PRB 515 (e.g., the PRB 515-*e*) to the starting PRB (e.g., the PRB 515-*d* obtained as described herein) in the SBFD slot 535 in a cyclic manner. As an illustrative example, the UE 115 may use Equation 2 to obtain the second hop PRB for the slot 535-*a*:

Second.Hop.PRB.SBFD=mod(starting.PRB.SBFD+
(second.hop.PRB−Starting.PRB.SBFD),
N.SBFD)   (2)

In Equation 2, Second.Hop.PRB.SBFD may represent the PRB 515-*f* (e.g., the PRB 515-*f* may be the result for the second hop of slot 535-*a* as a result of Equation 2), starting.PRB.SBFD may represent the first PRB 515 hop of the slot 535-*a* after equation 1 (e.g., the PRB 515-*d*), second-.hop.PRB may represent the second hop of the slot 535-*a* prior to applying equation 2 (e.g., PRB 515-*e*), and N.SBFD may represent a total quantity of PRBs 515 in the slot 535-*a* (e.g., a quantity of PRB indices for the whole band, the uplink portion of the slot 535-*a*).

In some cases, the UE 115 may be configured with a threshold distance between hops by the network node 105 as described herein. In some examples, the network node 105 may transmit control signaling indicating different frequency hops for slots 535 and slots 530 as described herein with reference to FIGS. 2-4. The UE 115 applying the frequency offset to the PRB 515-*c* (e.g., the first hop) and the PRB 515-*e* (e.g., the second hop) may result in the UE 115 communicating uplink data in an uplink data region 525 of the slot 535-*a*, rather than in the downlink data region 510 of the slot 535-*a*.

In some examples, although the various frequency hopping schemes of FIGS. 3-5 describe exemplary techniques for applying an offset, other techniques may additionally or alternatively be used. For example, the devices may use differences between PRBs to cyclically apply the offset, the devices may be configured with a value for the offset (e.g., pre-configured or configured via control signaling), a default (e.g., fallback) hop position may be configured for slots 535 or slots 530, or any combination thereof.

Figure 6:
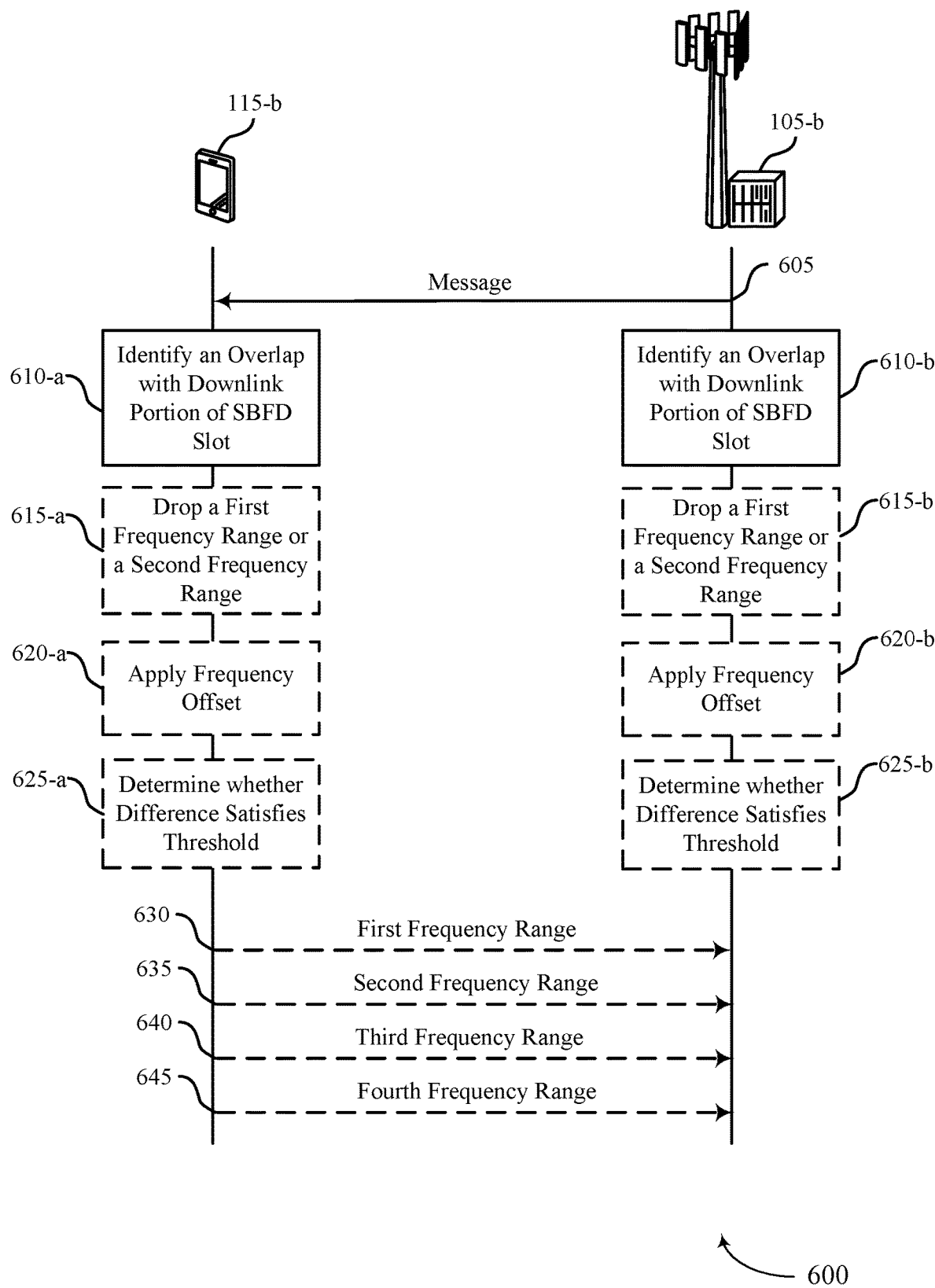
FIG. 6 illustrates an example of a process flow that supports techniques for cyclic frequency hopping in sub-band full duplex slots in accordance with one or more aspects of the present disclosure.

FIG. 6 illustrates an example of a process flow 600 that supports techniques for cyclic frequency hopping in sub-band full duplex slots in accordance with one or more aspects of the present disclosure. In some examples, process flow 600 may implement aspects of wireless communications systems 100 and 200, frequency hopping schemes 300, 400, and 500, or any combination thereof. For example, process flow 600 may include a UE 115-*b* and a network node 105-*b*, which may be examples of corresponding devices described herein.

In the following description of the process flow 600, the operations between the UE 115-*b* and the network node 105-*b* may be transmitted in a different order than the order shown, or the operations performed by the UE 115-*b* and the network node 105-*b* may be performed in different orders or at different times. Some operations may also be left out of the process flow 600, or other operations may be added to the process flow 600. It is to be understood that while the UE 115-*b* and the network node 105-*b* are shown performing a number of the operations of process flow 600, any wireless device may perform the operations shown.

At 605, the network node 105-*b* may transmit a message to the UE 115-*b*. The message may indicate at least a first frequency range for uplink data and a second frequency range for the uplink data. In some examples, the message may indicate a third frequency range, a fourth frequency range, or both, for transmission of the uplink data during a sub-band full duplex duration. In some examples, the message at 605 may indicate that the network node 105-*b* supports (e.g., applies, configures the UE 115-*b* to apply) the frequency hopping techniques described herein. Additionally or alternatively, the message may be transmitted in response to the UE 115-*b* indicating a capability to support the frequency hopping techniques described herein.

At 610, in some examples, the UE 115-*b*, the network node 105-*b*, or both may identify an overlap of the first frequency range, the second frequency range, or both with a downlink portion of the sub-band full duplex duration. For example, a first hop, a second hop, or both for uplink communications may overlap with a downlink portion of a SBFD slot as described herein with reference to FIGS. 1-5.

At 615, in some examples, the UE 115-*b*, the network node 105-*b*, or both may drop the first frequency range or the second frequency range based on the first frequency range or the second frequency range overlapping with the downlink portion of the sub-band full duplex duration. In some examples, dropping a frequency range may be an example of or referred to as applying an offset (e.g., such that the transmission of the dropped frequency range is instead transmitted on a frequency range that is not dropped).

At 620, in some examples, the UE 115-*b*, the network node 105-*b*, or both may apply a frequency offset for at least one of the first frequency range or the second frequency range as described herein with reference to FIGS. 1-5. The UE 115-*b*, the network node 105-*b*, or both may apply the frequency offset based on the first frequency range, the second frequency range, or both, overlapping with a downlink portion of the sub-band full duplex duration. In some cases, the UE 115-*b*, the network node 105-*b*, or both may apply the frequency offset to the second frequency range based on the second frequency range overlapping with the downlink portion of the sub-band full duplex duration. The UE 115-*b* may apply the frequency offset to the first frequency range based on the first frequency range overlapping with the downlink portion of the sub-band full duplex duration. In some cases, the UE 115-*b* may apply a difference between the first frequency range and the second frequency range to the first frequency range, the second frequency range, or both.

In some cases, the UE 115-*b*, the network node 105-*b*, or both may apply a second difference between the first frequency range and the second frequency range to the first frequency range, the second frequency range, or both. In some cases, where both the first frequency range and the second frequency range overlap with the downlink portion of the sub-band full duplex duration, the UE 115-*b*, the network node 105-*b*, or both may identify an initial frequency range for the sub-band full duplex duration based on a difference between the first frequency range and an initial index of a duration prior to the sub-band full duplex duration, an initial index of the sub-band full duplex duration, or both. The UE 115-*b*, the network node 105-*b*, or both may apply the frequency offset to the second frequency range based on a difference between the initial frequency range and the second frequency range.

At 625, in some examples, the UE 115-*b*, the network node 105-*b*, or both may determine whether the applied difference satisfies a threshold as described herein with reference to FIGS. 1-5. The threshold may indicate that a frequency range associated with applying the difference fails to overlap with the downlink portion of the sub-band full duplex duration. In some cases, the UE 115-*b*, the network node 105-*b*, or both may select a third frequency range for transmission of the uplink data based on the applied difference satisfying the threshold.

The UE 115-*b*, the network node 105-*b*, or both may determine whether to apply the second difference to the first frequency range, the second frequency range, or both based on the applied difference failing to satisfy the threshold. In some cases, the UE 115-*b*, the network node 105-*b*, or both may determine whether the applied frequency offset satisfies a threshold distance between the first frequency range and the third frequency range or a second threshold distance between the second frequency range and the third frequency range. The third frequency range may be a result of applying the frequency offset to the first frequency range or the second frequency range. The UE 115-*b*, the network node 105-*b*, or both may drop at least the third frequency range based on the frequency offset failing to satisfy the threshold distance.

At 630, in some examples, the UE 115-*b* may transmit the uplink data in the first frequency range during a first portion of the sub-band full duplex duration. In one example, the UE 115-*b* may transmit the uplink in the first frequency range during the first duration of the sub-band full duplex duration based on the UE 115-*b*, the network node 105-*b*, or both dropping the first frequency range.

At 635, in some examples, the UE 115-*b* may transmit the uplink data in the second frequency range during the first portion of the sub-band full duplex duration. In one example, the UE 115-*b* may transmit the uplink in the second frequency range during the first duration of the sub-band full duplex duration based on the UE 115-*b*, the network node 105-*b*, or both dropping the second frequency range.

At 640, in some examples, the UE 115-*b* may transmit the uplink data in the third frequency range during the first portion of the sub-band full duplex duration. The UE 115-*b* may transmit the uplink data based on applying the frequency offset for the first frequency range. In some cases, the UE 115-*b* may transmit the uplink data in the initial frequency range and the third frequency range based on applying the frequency offset.

At 645, in some examples, the UE 115-*b* may transmit the uplink data in a fourth frequency range during the first portion of the sub-band full duplex duration. The UE 115-*b* may transmit the uplink data based on applying the frequency offset for the second frequency range.

Figure 7:
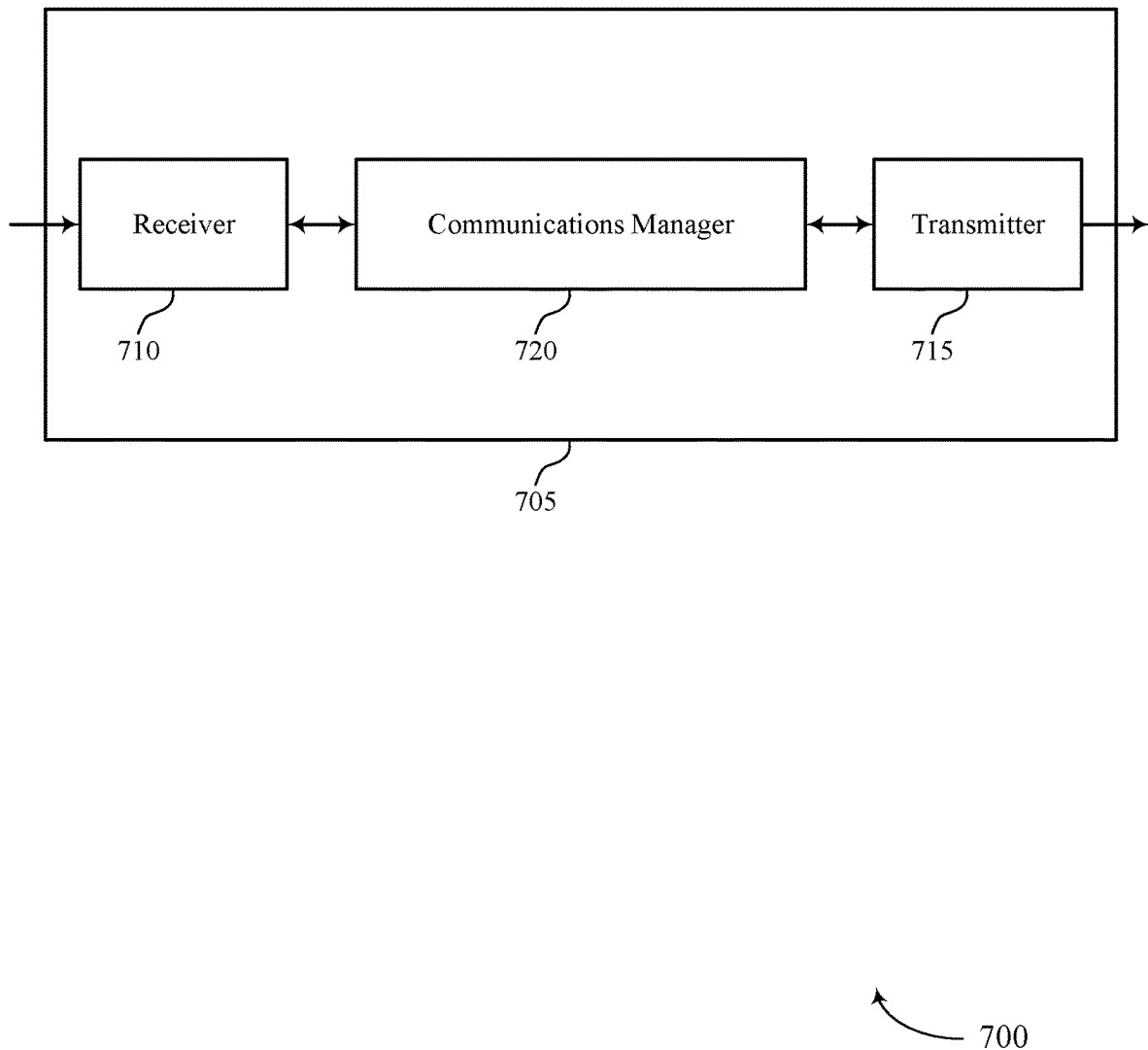
FIGS. 7 and 8 show block diagrams of devices that support techniques for cyclic frequency hopping in sub-band full duplex slots in accordance with one or more aspects of the present disclosure.

FIG. 7 shows a block diagram 700 of a device 705 that supports techniques for cyclic frequency hopping in sub-band full duplex slots in accordance with one or more aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the frequency hopping features discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for cyclic frequency hopping in sub-band full duplex slots). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for cyclic frequency hopping in sub-band full duplex slots). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for cyclic frequency hopping in sub-band full duplex slots as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving a message indicating at least a first frequency range for uplink data and a second frequency range for the uplink data. The communications manager 720 may be configured as or otherwise support a means for applying a frequency offset for at least one of the first frequency range or the second frequency range based on the first frequency range, the second frequency range, or both, overlapping with a downlink portion of a sub band full duplex duration. The communications manager 720 may be configured as or otherwise support a means for transmitting, during a first portion of the sub band full duplex duration, the uplink data in the first frequency range, the second frequency range, or a third frequency range based on applying the frequency offset for at least one of the first frequency range or the second frequency range.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for frequency hopping adjustment. For example, the device 705 may adjust hops from portions of SBFD slots to an appropriate portion as described herein, which may result in reduced self-interference, improved communications reliability, or both, among other examples of benefits.

Figure 8:
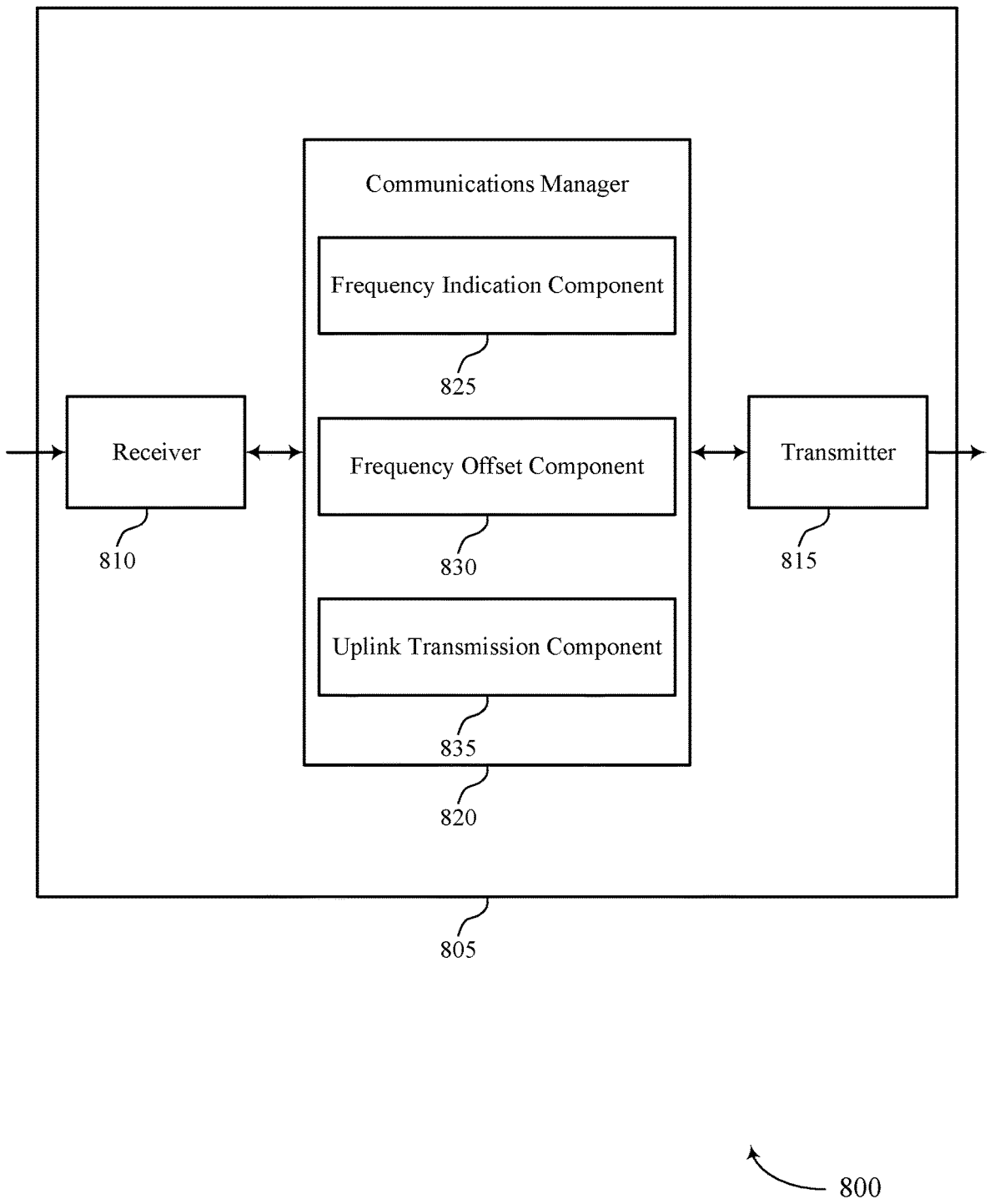

FIG. 8 shows a block diagram 800 of a device 805 that supports techniques for cyclic frequency hopping in sub-band full duplex slots in accordance with one or more aspects of the present disclosure. The device 805 may be an example of aspects of a device 705 or a UE 115 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the frequency-hopping features discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for cyclic frequency hopping in sub-band full duplex slots). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for cyclic frequency hopping in sub-band full duplex slots). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for cyclic frequency hopping in sub-band full duplex slots as described herein. For example, the communications manager 820 may include a frequency indication component 825, a frequency offset component 830, an uplink transmission component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The frequency indication component 825 may be configured as or otherwise support a means for receiving a message indicating at least a first frequency range for uplink data and a second frequency range for the uplink data. The frequency offset component 830 may be configured as or otherwise support a means for applying a frequency offset for at least one of the first frequency range or the second frequency range based on the first frequency range, the second frequency range, or both, overlapping with a downlink portion of a sub band full duplex duration. The uplink transmission component 835 may be configured as or otherwise support a means for transmitting, during a first portion of the sub band full duplex duration, the uplink data in the first frequency range, the second frequency range, or a third frequency range based on applying the frequency offset for at least one of the first frequency range or the second frequency range.

In some cases, the frequency indication component 825, the frequency offset component 830, and the uplink transmission component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the frequency indication component 825, the frequency offset component 830, and the uplink transmission component 835 as discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
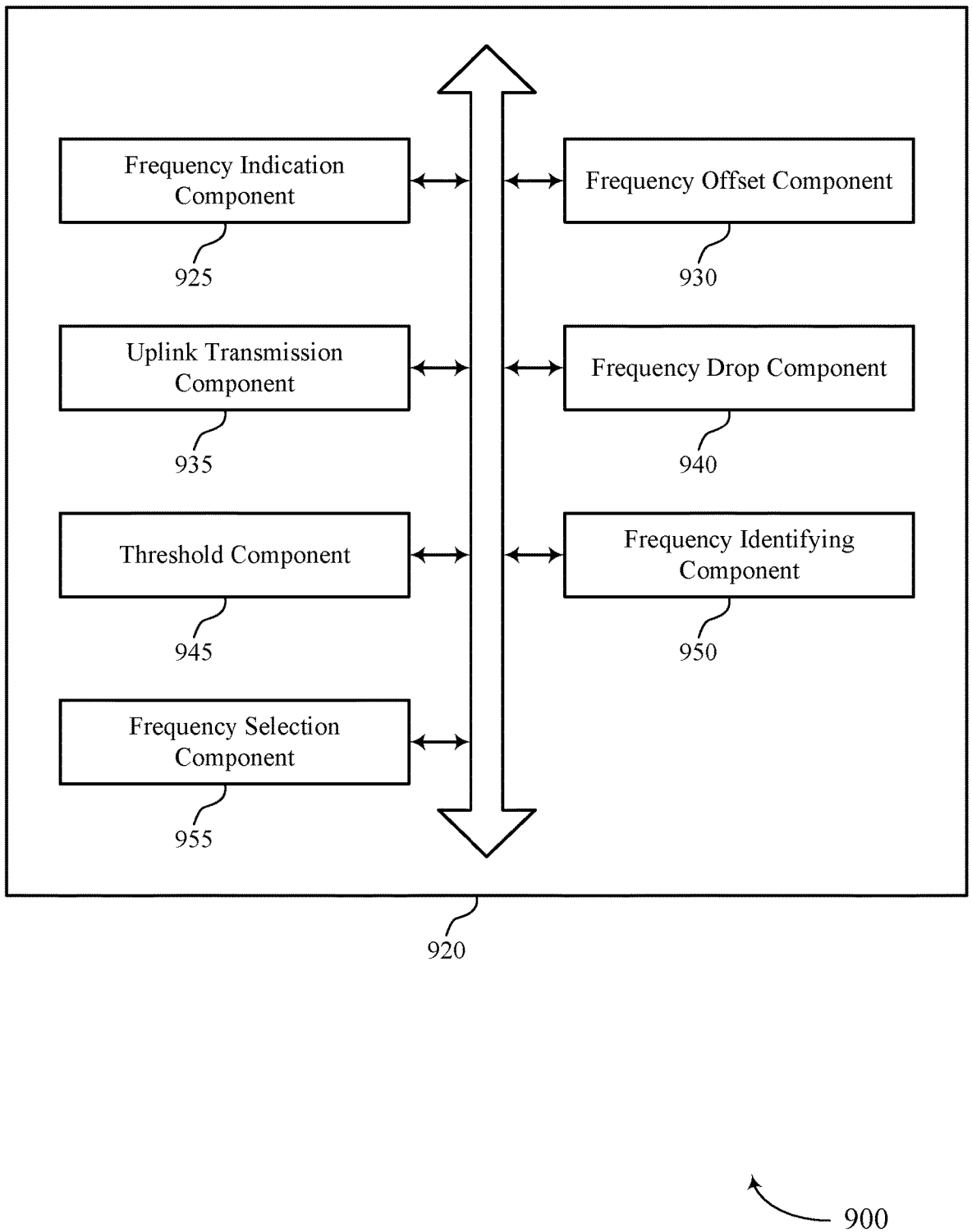
FIG. 9 shows a block diagram of a communications manager that supports techniques for cyclic frequency hopping in sub-band full duplex slots in accordance with one or more aspects of the present disclosure.

FIG. 9 shows a block diagram 900 of a communications manager 920 that supports techniques for cyclic frequency hopping in sub-band full duplex slots in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for cyclic frequency hopping in sub-band full duplex slots as described herein. For example, the communications manager 920 may include a frequency indication component 925, a frequency offset component 930, an uplink transmission component 935, a frequency drop component 940, a threshold component 945, a frequency identifying component 950, a frequency selection component 955, or any combination thereof. Each of these components may communicate, directly or indirectly, with one another (e.g., via one or more buses).

The communications manager 920 may support wireless communications at a UE in accordance with examples as disclosed herein. The frequency indication component 925 may be configured as or otherwise support a means for receiving a message indicating at least a first frequency range for uplink data and a second frequency range for the uplink data. The frequency offset component 930 may be configured as or otherwise support a means for applying a frequency offset for at least one of the first frequency range or the second frequency range based on the first frequency range, the second frequency range, or both, overlapping with a downlink portion of a sub band full duplex duration. The uplink transmission component 935 may be configured as or otherwise support a means for transmitting, during a first portion of the sub band full duplex duration, the uplink data in the first frequency range, the second frequency range, or a third frequency range based on applying the frequency offset for at least one of the first frequency range or the second frequency range.

In some examples, to support applying the frequency offset, the frequency drop component 940 may be configured as or otherwise support a means for dropping the first frequency range or the second frequency range based on the first frequency range or the second frequency range overlapping with the downlink portion of the sub band full duplex duration.

In some examples, the uplink transmission component 935 may be configured as or otherwise support a means for transmitting the uplink data in the first frequency range or the second frequency range during the sub band full duplex duration based on dropping the first frequency range or the second frequency range.

In some examples, to support applying the frequency offset, the frequency offset component 930 may be configured as or otherwise support a means for applying a difference between the first frequency range and the second frequency range to the first frequency range, the second frequency range, or both. In some examples, to support applying the frequency offset, the threshold component 945 may be configured as or otherwise support a means for determining whether the applied difference satisfies a threshold, the threshold indicating that a frequency range associated with applying the difference fails to overlap with the downlink portion of the sub band full duplex duration.

In some examples, the frequency selection component 955 may be configured as or otherwise support a means for selecting the third frequency range for transmission of the uplink data based on the applied difference satisfying the threshold.

In some examples, the frequency offset component 930 may be configured as or otherwise support a means for applying a second difference between the first frequency range and the second frequency range to the first frequency range, the second frequency range, or both, based on the applied difference failing to satisfy the threshold.

In some examples, the frequency offset component 930 may be configured as or otherwise support a means for applying the frequency offset to the second frequency range based on the second frequency range overlapping with the downlink portion of the sub band full duplex duration. In some examples, the frequency offset component 930 may be configured as or otherwise support a means for applying the frequency offset to the first frequency range based on the first frequency range overlapping with the downlink portion of the sub band full duplex duration.

In some examples, the frequency identifying component 950 may be configured as or otherwise support a means for identifying an initial frequency range for the sub band full duplex duration based on a difference between the first frequency range and an initial index of a duration prior to the sub band full duplex duration, an initial index of the sub band full duplex duration, or both. In some examples, the frequency offset component 930 may be configured as or otherwise support a means for applying the frequency offset to the second frequency range based on a difference between the initial frequency range and the second frequency range. In some examples, the uplink transmission component 935 may be configured as or otherwise support a means for transmitting the uplink data in the initial frequency range and the third frequency range based on applying the frequency offset.

In some examples, the threshold component 945 may be configured as or otherwise support a means for determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range. In some examples, the frequency drop component 940 may be configured as or otherwise support a means for dropping at least the third frequency range based on the applied frequency offset failing to satisfy the threshold distance.

In some examples, to support receiving the message, the frequency indication component 925 may be configured as or otherwise support a means for receiving the message indicating the third frequency range, a fourth frequency range, or both, for transmission of the uplink data during the sub band full duplex duration.

In some cases, the frequency indication component 925, the frequency offset component 930, the uplink transmission component 935, the frequency drop component 940, the threshold component 945, the frequency identifying component 950, and the frequency selection component 955 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the frequency indication component 925, the frequency offset component 930, the uplink transmission component 935, the frequency drop component 940, the threshold component 945, the frequency identifying component 950, and the frequency selection component 955 discussed herein.

Figure 10:
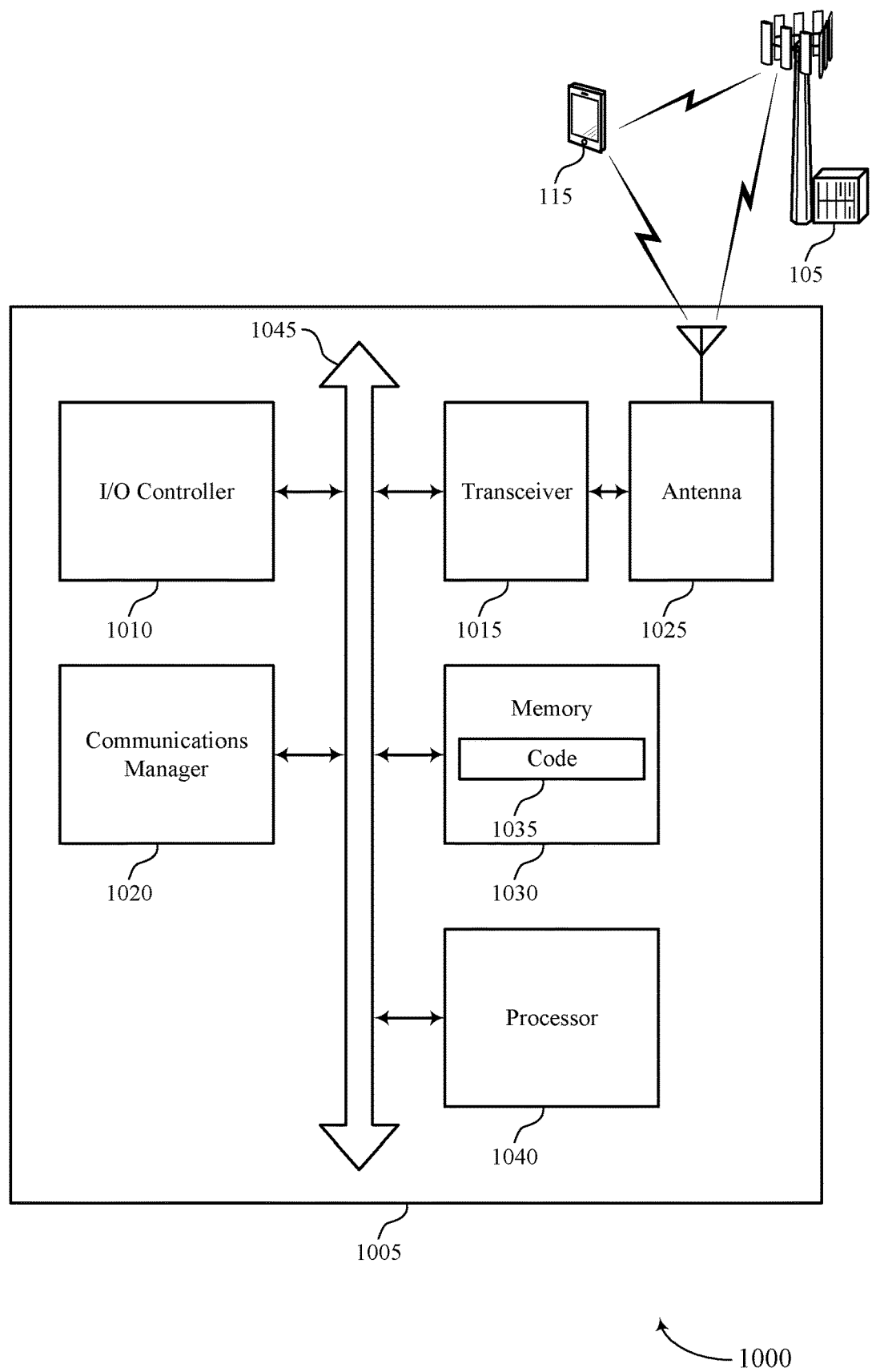
FIG. 10 shows a diagram of a system including a device that supports techniques for cyclic frequency hopping in sub-band full duplex slots in accordance with one or more aspects of the present disclosure.

FIG. 10 shows a diagram of a system 1000 including a device 1005 that supports techniques for cyclic frequency hopping in sub-band full duplex slots in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for cyclic frequency hopping in sub-band full duplex slots). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a message indicating at least a first frequency range for uplink data and a second frequency range for the uplink data. The communications manager 1020 may be configured as or otherwise support a means for applying a frequency offset for at least one of the first frequency range or the second frequency range based on the first frequency range, the second frequency range, or both, overlapping with a downlink portion of a sub band full duplex duration. The communications manager 1020 may be configured as or otherwise support a means for transmitting, during a first portion of the sub band full duplex duration, the uplink data in the first frequency range, the second frequency range, or a third frequency range based on applying the frequency offset for at least one of the first frequency range or the second frequency range.

By including or configuring the communications manager 1020 in accordance with examples as described herein, the device 1005 may support techniques for frequency hopping adjustments. For example, the device 1005 may adjust hops from portions of SBFD slots to an appropriate portion as described herein, which may result in reduced self-interference, improved communications reliability, or both, among other examples of benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for cyclic frequency hopping in sub-band full duplex slots as described herein, or the processor 1040 and the memory 1030 may be otherwise configured to perform or support such operations.

Figure 11:
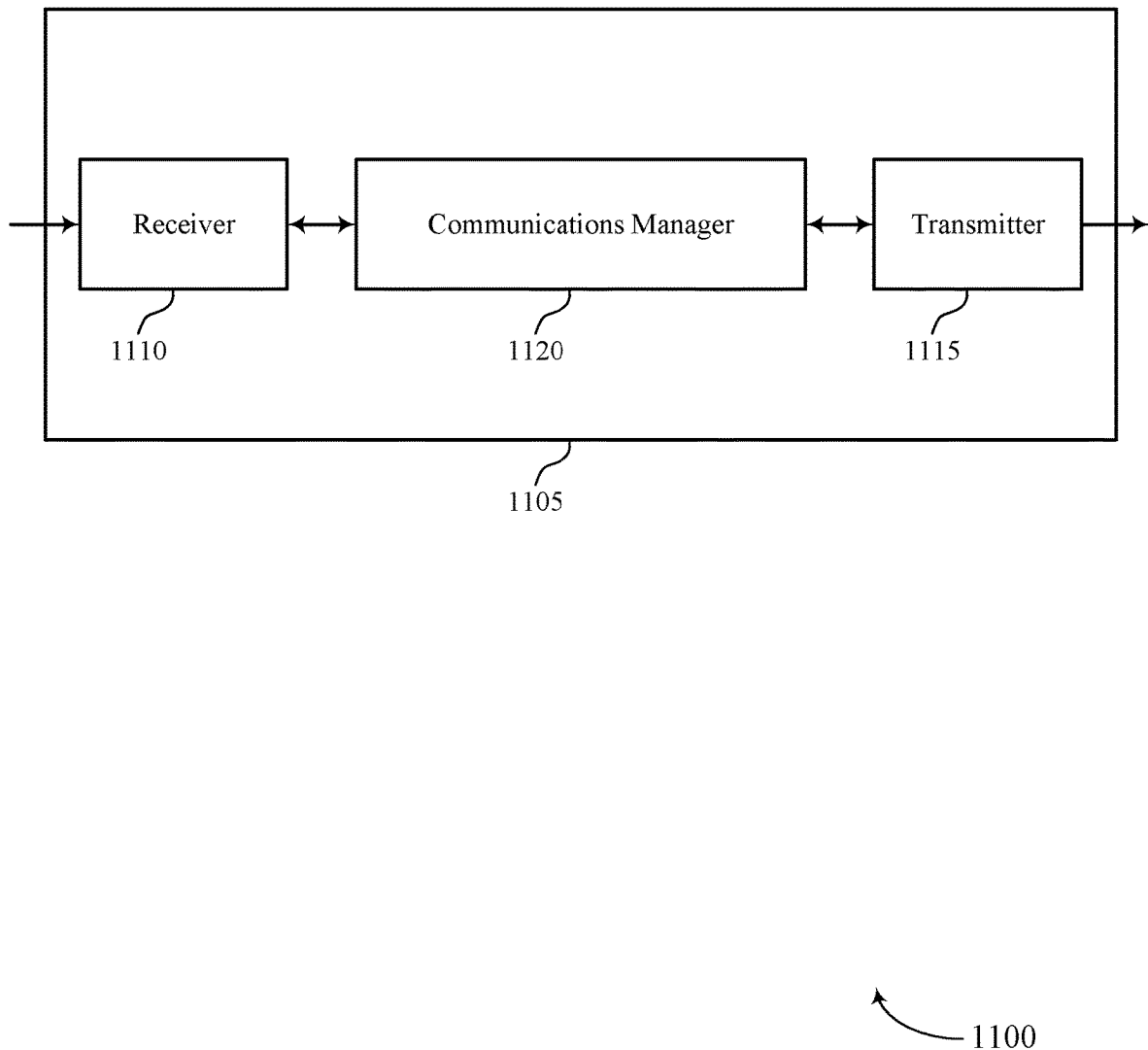
FIGS. 11 and 12 show block diagrams of devices that support techniques for cyclic frequency hopping in sub-band full duplex slots in accordance with one or more aspects of the present disclosure.

FIG. 11 shows a block diagram 1100 of a device 1105 that supports techniques for cyclic frequency hopping in sub-band full duplex slots in accordance with one or more aspects of the present disclosure. The device 1105 may be an example of aspects of a network node 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the frequency hopping features discussed herein. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for cyclic frequency hopping in sub-band full duplex slots as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network node in accordance with examples as disclosed herein. For example, the communications manager 1120 may be configured as or otherwise support a means for transmitting a message indicating at least a first frequency range for uplink data and a second frequency range for the uplink data. The communications manager 1120 may be configured as or otherwise support a means for applying a frequency offset for at least one of the first frequency range or the second frequency range based on the first frequency range, the second frequency range, or both, overlapping with a downlink portion of a sub band full duplex duration. The communications manager 1120 may be configured as or otherwise support a means for receiving, during a first portion of the sub band full duplex duration, the uplink data in the first frequency range, the second frequency range, or a third frequency range based on applying the frequency offset for at least one of the first frequency range or the second frequency range.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for frequency hopping adjustments. For example, the device 1105 may adjust hops from portions of SBFD slots to an appropriate portion as described herein, which may result in reduced self-interference, improved communications reliability, or both, among other examples of benefits.

Figure 12:
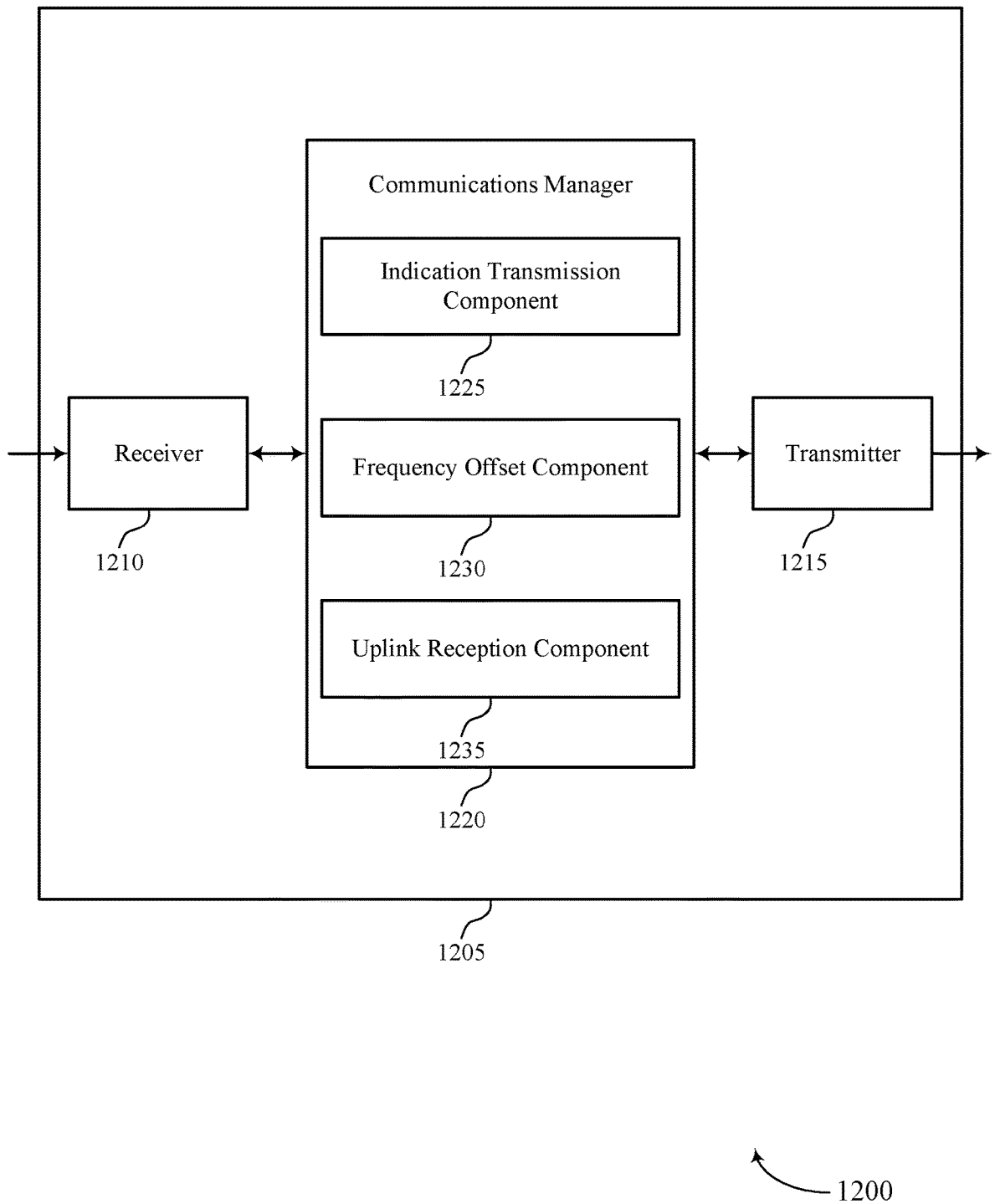

FIG. 12 shows a block diagram 1200 of a device 1205 that supports techniques for cyclic frequency hopping in sub-band full duplex slots in accordance with one or more aspects of the present disclosure. The device 1205 may be an example of aspects of a device 1105 or a network node 105 as described herein. The device 1205 may include a receiver 1210, a transmitter 1215, and a communications manager 1220. The device 1205 may also include one or more processors, memory coupled with the one or more processors, and instructions stored in the memory that are executable by the one or more processors to enable the one or more processors to perform the frequency hopping features discussed herein. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for cyclic frequency hopping in sub-band full duplex slots as described herein. For example, the communications manager 1220 may include an indication transmission component 1225, a frequency offset component 1230, an uplink reception component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network node in accordance with examples as disclosed herein. The indication transmission component 1225 may be configured as or otherwise support a means for transmitting a message indicating at least a first frequency range for uplink data and a second frequency range for the uplink data. The frequency offset component 1230 may be configured as or otherwise support a means for applying a frequency offset for at least one of the first frequency range or the second frequency range based on the first frequency range, the second frequency range, or both, overlapping with a downlink portion of a sub band full duplex duration. The uplink reception component 1235 may be configured as or otherwise support a means for receiving, during a first portion of the sub band full duplex duration, the uplink data in the first frequency range, the second frequency range, or a third frequency range based on applying the frequency offset for at least one of the first frequency range or the second frequency range.

Figure 13:
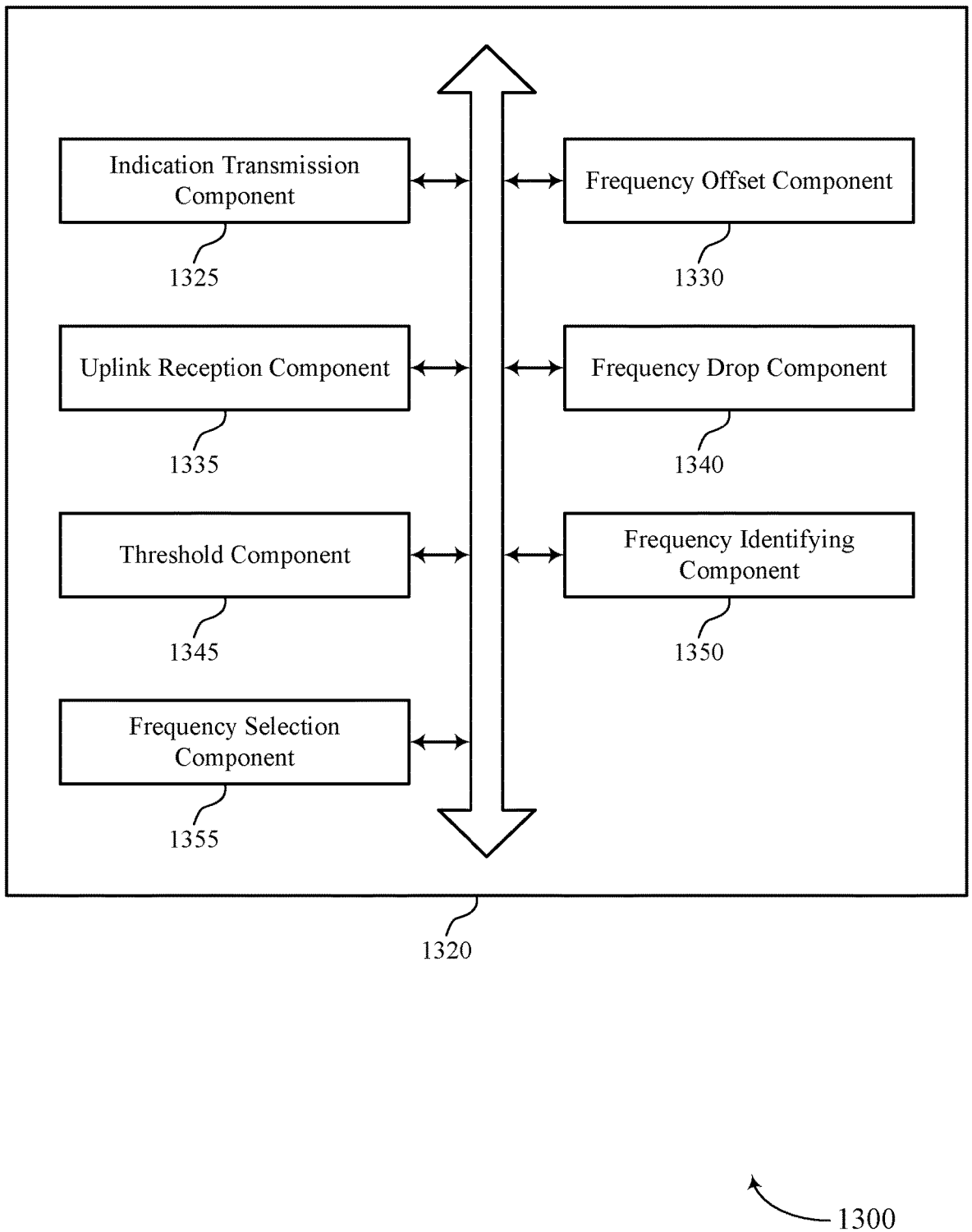
FIG. 13 shows a block diagram of a communications manager that supports techniques for cyclic frequency hopping in sub-band full duplex slots in accordance with one or more aspects of the present disclosure.

FIG. 13 shows a block diagram 1300 of a communications manager 1320 that supports techniques for cyclic frequency hopping in sub-band full duplex slots in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for cyclic frequency hopping in sub-band full duplex slots as described herein. For example, the communications manager 1320 may include an indication transmission component 1325, a frequency offset component 1330, an uplink reception component 1335, a frequency drop component 1340, a threshold component 1345, a frequency identifying component 1350, a frequency selection component 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1320 may support wireless communications at a network node in accordance with examples as disclosed herein. The indication transmission component 1325 may be configured as or otherwise support a means for transmitting a message indicating at least a first frequency range for uplink data and a second frequency range for the uplink data. The frequency offset component 1330 may be configured as or otherwise support a means for applying a frequency offset for at least one of the first frequency range or the second frequency range based on the first frequency range, the second frequency range, or both, overlapping with a downlink portion of a sub band full duplex duration. The uplink reception component 1335 may be configured as or otherwise support a means for receiving, during a first portion of the sub band full duplex duration, the uplink data in the first frequency range, the second frequency range, or a third frequency range based on applying the frequency offset for at least one of the first frequency range or the second frequency range.

In some examples, to support applying the frequency offset, the frequency drop component 1340 may be configured as or otherwise support a means for dropping the first frequency range or the second frequency range based on the first frequency range or the second frequency range overlapping with the downlink portion of the sub band full duplex duration.

In some examples, the uplink reception component 1335 may be configured as or otherwise support a means for receiving the uplink data in the first frequency range or the second frequency range during the sub band full duplex duration based on dropping the first frequency range or the second frequency range.

In some examples, to support applying the frequency offset, the frequency offset component 1330 may be configured as or otherwise support a means for applying a difference between the first frequency range and the second frequency range to the first frequency range, the second frequency range, or both. In some examples, to support applying the frequency offset, the threshold component 1345 may be configured as or otherwise support a means for determining whether the applied difference satisfies a threshold, the threshold indicating that a frequency range associated with applying the difference fails to overlap with the downlink portion of the sub band full duplex duration.

In some examples, the frequency selection component 1355 may be configured as or otherwise support a means for selecting the third frequency range for transmission of the uplink data based on the applied difference satisfying the threshold.

In some examples, the frequency offset component 1330 may be configured as or otherwise support a means for applying a second difference between the first frequency range and the second frequency range to the first frequency range, the second frequency range, or both, based on the applied difference failing to satisfy the threshold.

In some examples, the frequency offset component 1330 may be configured as or otherwise support a means for applying the frequency offset to the second frequency range based on the second frequency range overlapping with the downlink portion of the sub band full duplex duration. In some examples, the frequency offset component 1330 may be configured as or otherwise support a means for applying the frequency offset to the first frequency range based on the first frequency range overlapping with the downlink portion of the sub band full duplex duration.

In some examples, the frequency identifying component 1350 may be configured as or otherwise support a means for identifying an initial frequency range for the sub band full duplex duration based on a difference between the first frequency range and an initial index of a duration prior to the sub band full duplex duration, an initial index of the sub band full duplex duration, or both. In some examples, the frequency offset component 1330 may be configured as or otherwise support a means for applying the frequency offset to the second frequency range based on a difference between the initial frequency range and the second frequency range. In some examples, the uplink reception component 1335 may be configured as or otherwise support a means for receiving the uplink data in the initial frequency range and the third frequency range based on applying the frequency offset.

In some examples, the threshold component 1345 may be configured as or otherwise support a means for determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range. In some examples, the frequency drop component 1340 may be configured as or otherwise support a means for dropping at least the third frequency range based on the applied frequency offset failing to satisfy the threshold distance.

In some examples, to support transmitting the message, the indication transmission component 1325 may be configured as or otherwise support a means for transmitting the message indicating the third frequency range, a fourth frequency range, or both, for transmission of the uplink data during the sub band full duplex duration.

In some cases, the indication transmission component 1325, the frequency offset component 1330, the uplink reception component 1335, the frequency drop component 1340, the threshold component 1345, the frequency identifying component 1350, and the frequency selection component 1355 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the indication transmission component 1325, the frequency offset component 1330, the uplink reception component 1335, the frequency drop component 1340, the threshold component 1345, the frequency identifying component 1350, and the frequency selection component 1355 as discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
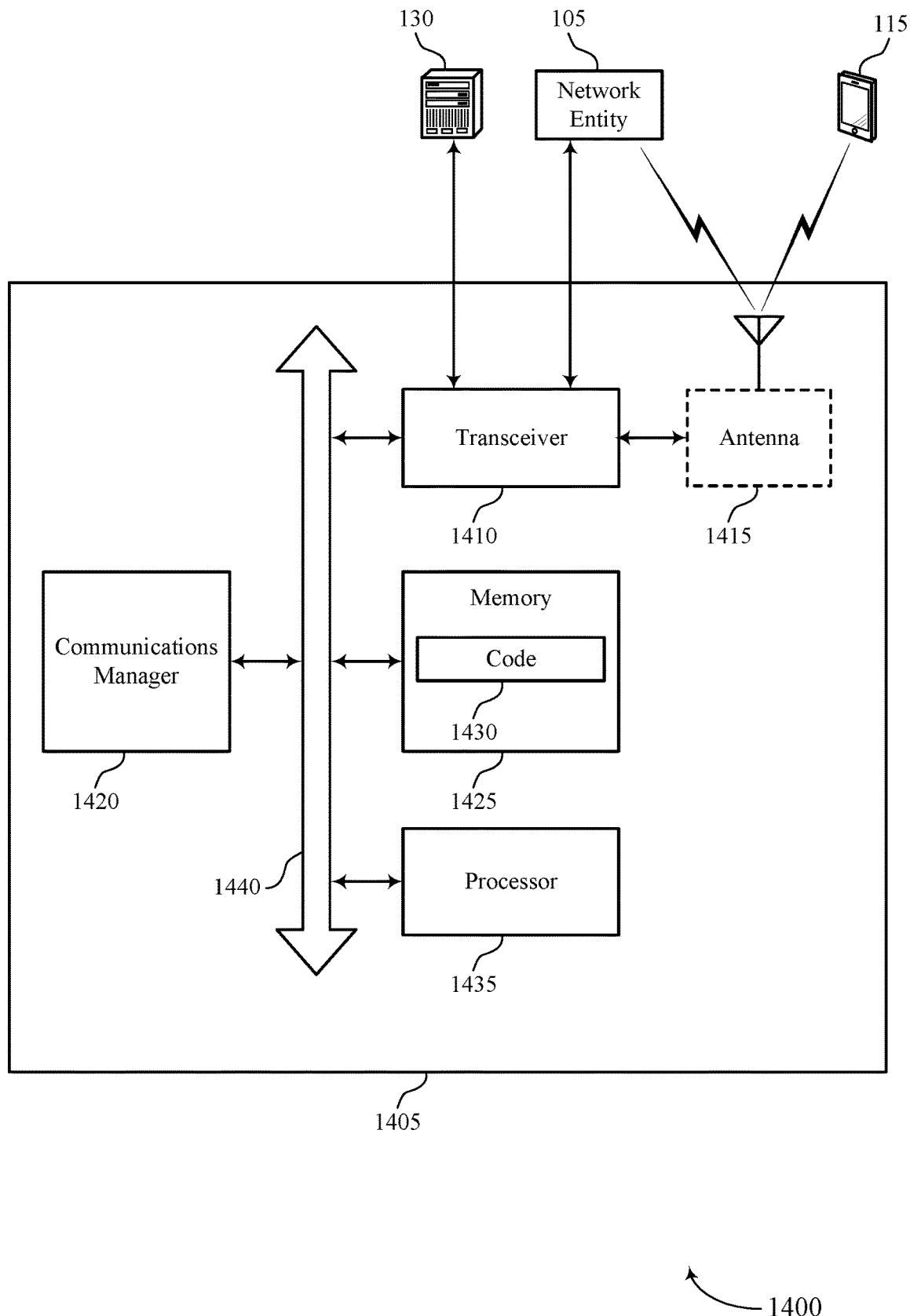
FIG. 14 shows a diagram of a system including a device that supports techniques for cyclic frequency hopping in sub-band full duplex slots in accordance with one or more aspects of the present disclosure.

FIG. 14 shows a diagram of a system 1400 including a device 1405 that supports techniques for cyclic frequency hopping in sub-band full duplex slots in accordance with one or more aspects of the present disclosure. The device 1405 may be an example of or include the components of a device 1105, a device 1205, or a network node 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for cyclic frequency hopping in sub-band full duplex slots). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network node in accordance with examples as disclosed herein. For example, the communications manager 1420 may be configured as or otherwise support a means for transmitting a message indicating at least a first frequency range for uplink data and a second frequency range for the uplink data. The communications manager 1420 may be configured as or otherwise support a means for applying a frequency offset for at least one of the first frequency range or the second frequency range based on the first frequency range, the second frequency range, or both, overlapping with a downlink portion of a sub band full duplex duration. The communications manager 1420 may be configured as or otherwise support a means for receiving, during a first portion of the sub band full duplex duration, the uplink data in the first frequency range, the second frequency range, or a third frequency range based on applying the frequency offset for at least one of the first frequency range or the second frequency range.

By including or configuring the communications manager 1420 in accordance with examples as described herein, the device 1405 may support techniques for frequency hopping adjustments. For example, the device 1405 may adjust hops from portions of SBFD slots to an appropriate portion as described herein, which may result in reduced self-interference, improved communications reliability, or both, among other examples of benefits.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of techniques for cyclic frequency hopping in sub-band full duplex slots as described herein, or the processor 1435 and the memory 1425 may be otherwise configured to perform or support such operations.

In some cases, the frequency indication component 925, the frequency offset component 930, the uplink transmission component 935, the frequency drop component 940, the threshold component 945, the frequency identifying component 950, and the frequency selection component 955 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the frequency indication component 925, the frequency offset component 930, the uplink transmission component 935, the frequency drop component 940, the threshold component 945, the frequency identifying component 950, and the frequency selection component 955 discussed herein.

Figure 15:
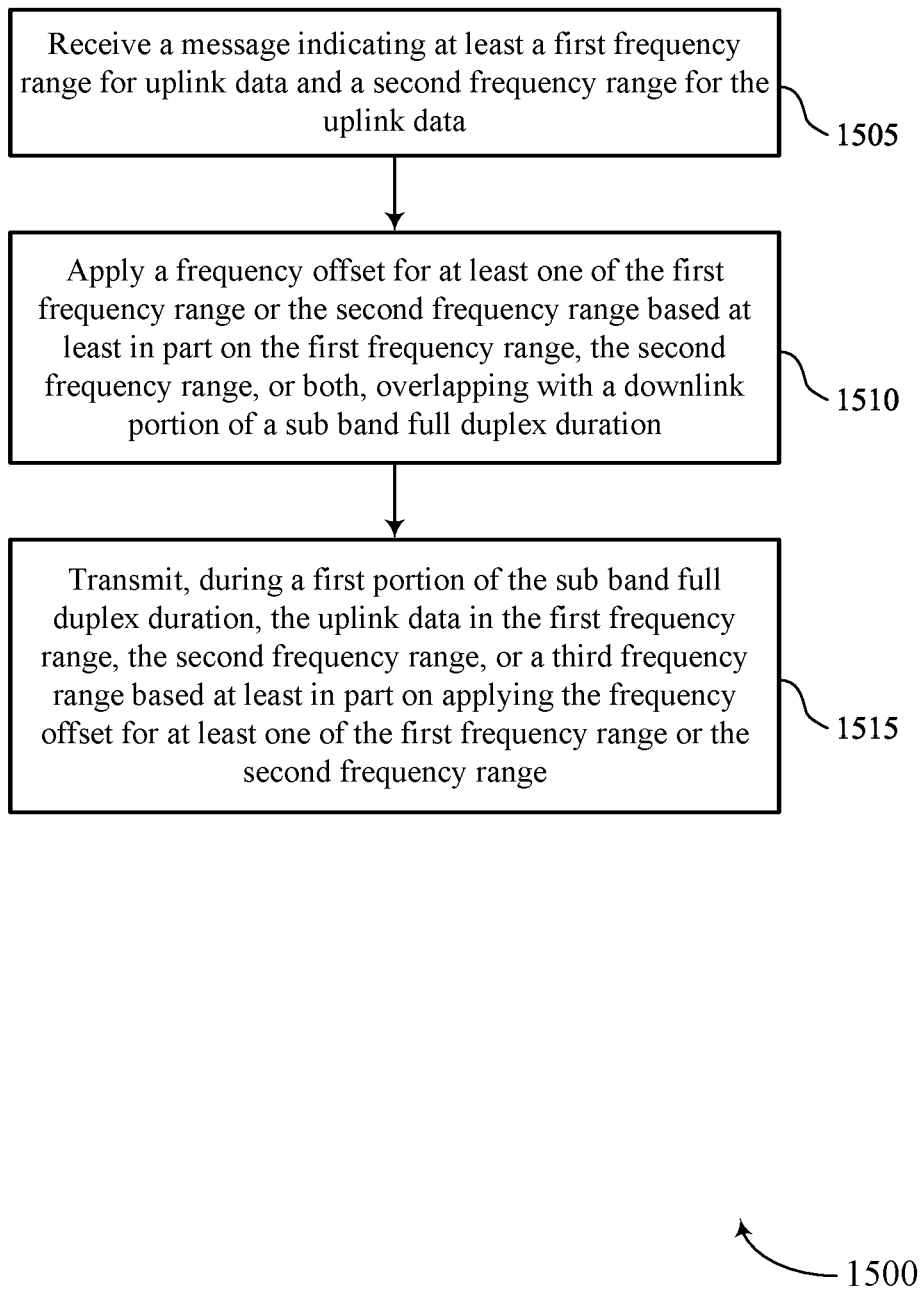
FIGS. 15 through 18 show flowcharts illustrating methods that support techniques for cyclic frequency hopping in sub-band full duplex slots in accordance with one or more aspects of the present disclosure.

FIG. 15 shows a flowchart illustrating a method 1500 that supports techniques for cyclic frequency hopping in sub-band full duplex slots in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating at least a first frequency range for uplink data and a second frequency range for the uplink data. The operations of 1505 may be performed in accordance with examples as disclosed herein. In some examples, aspects of the operations of 1505 may be performed by a frequency indication component 925 as described with reference to FIG. 9.

At 1510, the method may include applying a frequency offset for at least one of the first frequency range or the second frequency range based on the first frequency range, the second frequency range, or both, overlapping with a downlink portion of a sub band full duplex duration. The operations of 1510 may be performed in accordance with examples as disclosed herein. In some examples, aspects of the operations of 1510 may be performed by a frequency offset component 930 as described with reference to FIG. 9.

At 1515, the method may include transmitting, during a first portion of the sub band full duplex duration, the uplink data in the first frequency range, the second frequency range, or a third frequency range based on applying the frequency offset for at least one of the first frequency range or the second frequency range. The operations of 1515 may be performed in accordance with examples as disclosed herein. In some examples, aspects of the operations of 1515 may be performed by an uplink transmission component 935 as described with reference to FIG. 9.

Figure 16:
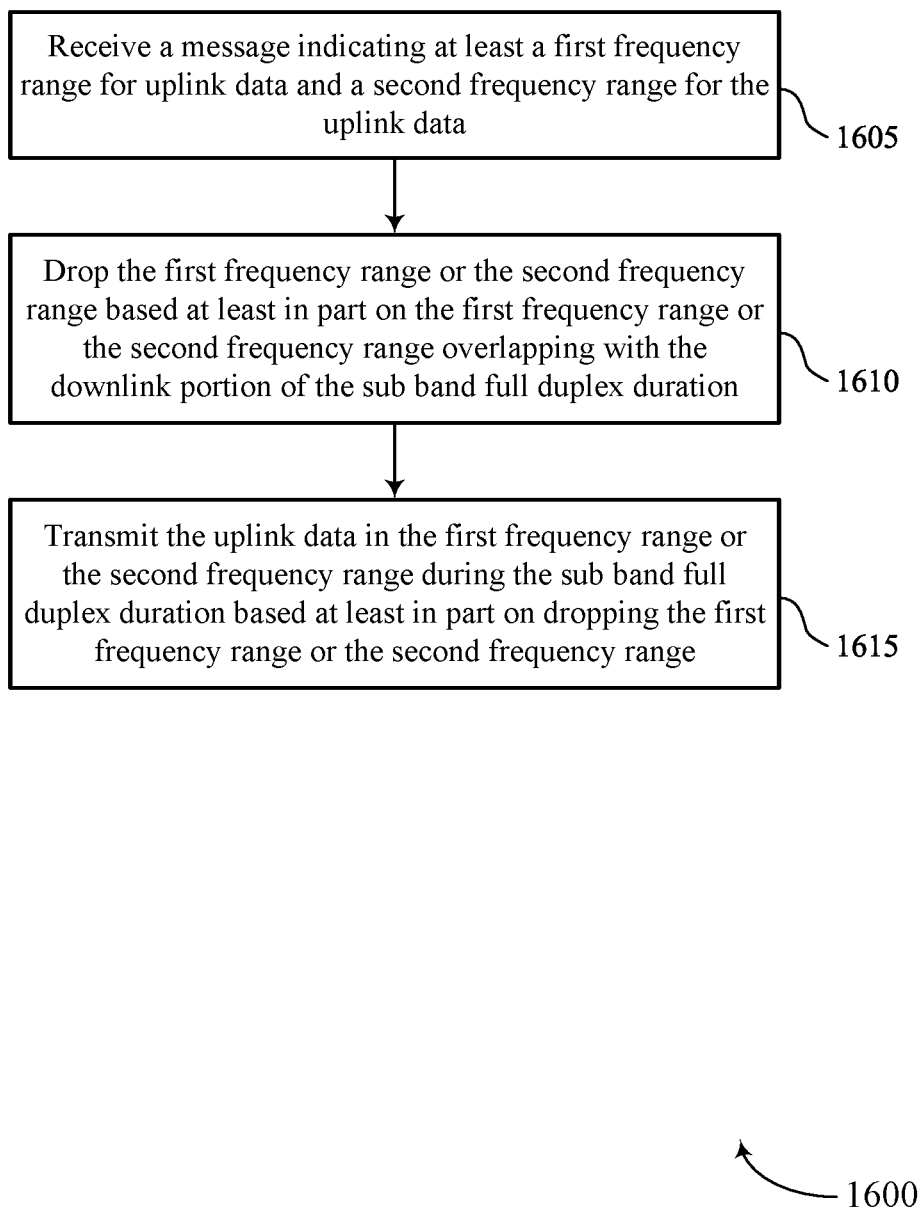

FIG. 16 shows a flowchart illustrating a method 1600 that supports techniques for cyclic frequency hopping in subband full duplex slots in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a message indicating at least a first frequency range for uplink data and a second frequency range for the uplink data. The operations of 1605 may be performed in accordance with examples as disclosed herein. In some examples, aspects of the operations of 1605 may be performed by a frequency indication component 925 as described with reference to FIG. 9.

At 1610, the method may include dropping the first frequency range or the second frequency range based on the first frequency range or the second frequency range overlapping with the downlink portion of the sub band full duplex duration. The operations of 1610 may be performed in accordance with examples as disclosed herein. In some examples, aspects of the operations of 1610 may be performed by a frequency drop component 940 as described with reference to FIG. 9.

At 1615, the method may include transmitting the uplink data in the first frequency range or the second frequency range during the sub band full duplex duration based on dropping the first frequency range or the second frequency range. The operations of 1615 may be performed in accordance with examples as disclosed herein. In some examples, aspects of the operations of 1615 may be performed by an uplink transmission component 935 as described with reference to FIG. 9.

At 1620, the method may include applying a frequency offset for at least one of the first frequency range or the second frequency range based on the first frequency range, the second frequency range, or both, overlapping with a downlink portion of a sub band full duplex duration. The operations of 1620 may be performed in accordance with examples as disclosed herein. In some examples, aspects of the operations of 1620 may be performed by a frequency offset component 930 as described with reference to FIG. 9.

At 1625, the method may include transmitting, during a first portion of the sub band full duplex duration, the uplink data in the first frequency range, the second frequency range, or a third frequency range based on applying the frequency offset for at least one of the first frequency range or the second frequency range. The operations of 1625 may be performed in accordance with examples as disclosed herein. In some examples, aspects of the operations of 1625 may be performed by an uplink transmission component 935 as described with reference to FIG. 9.

Figure 17:
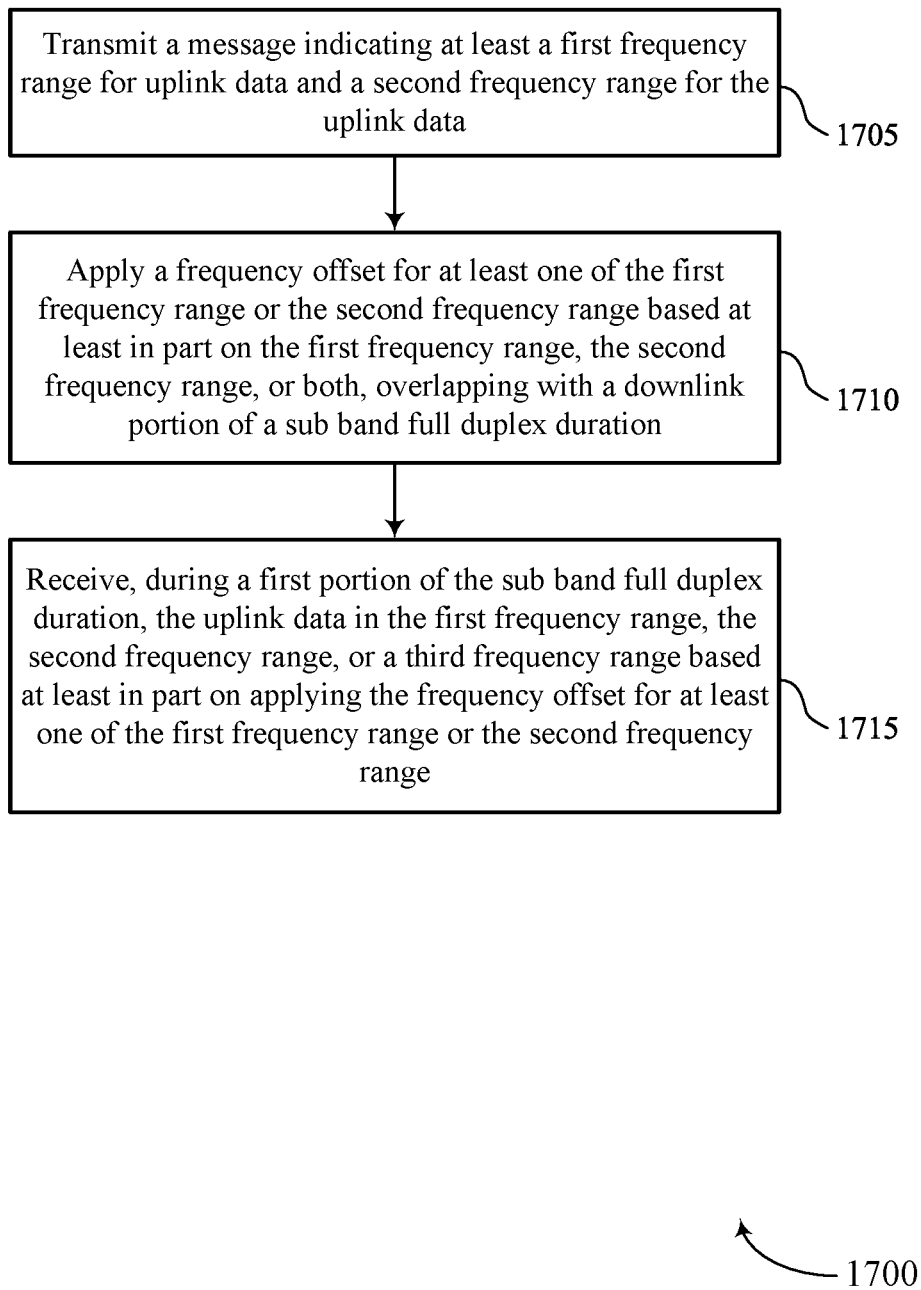

FIG. 17 shows a flowchart illustrating a method 1700 that supports techniques for cyclic frequency hopping in subband full duplex slots in accordance with one or more aspects of the present disclosure. The operations of the method 1700 may be implemented by a network node or its components as described herein. For example, the operations of the method 1700 may be performed by a network node as described with reference to FIGS. 1 through 6 and 11 through 14. In some examples, a network node may execute a set of instructions to control the functional elements of the network node to perform the described functions. Additionally, or alternatively, the network node may perform aspects of the described functions using special-purpose hardware.

At 1705, the method may include transmitting a message indicating at least a first frequency range for uplink data and a second frequency range for the uplink data. The operations of 1705 may be performed in accordance with examples as disclosed herein. In some examples, aspects of the operations of 1705 may be performed by an indication transmission component 1325 as described with reference to FIG. 13.

At 1710, the method may include applying a frequency offset for at least one of the first frequency range or the second frequency range based on the first frequency range, the second frequency range, or both, overlapping with a downlink portion of a sub band full duplex duration. The operations of 1710 may be performed in accordance with examples as disclosed herein. In some examples, aspects of the operations of 1710 may be performed by a frequency offset component 1330 as described with reference to FIG. 13.

At 1715, the method may include receiving, during a first portion of the sub band full duplex duration, the uplink data in the first frequency range, the second frequency range, or a third frequency range based on applying the frequency offset for at least one of the first frequency range or the second frequency range. The operations of 1715 may be performed in accordance with examples as disclosed herein. In some examples, aspects of the operations of 1715 may be performed by an uplink reception component 1335 as described with reference to FIG. 13.

Figure 18:
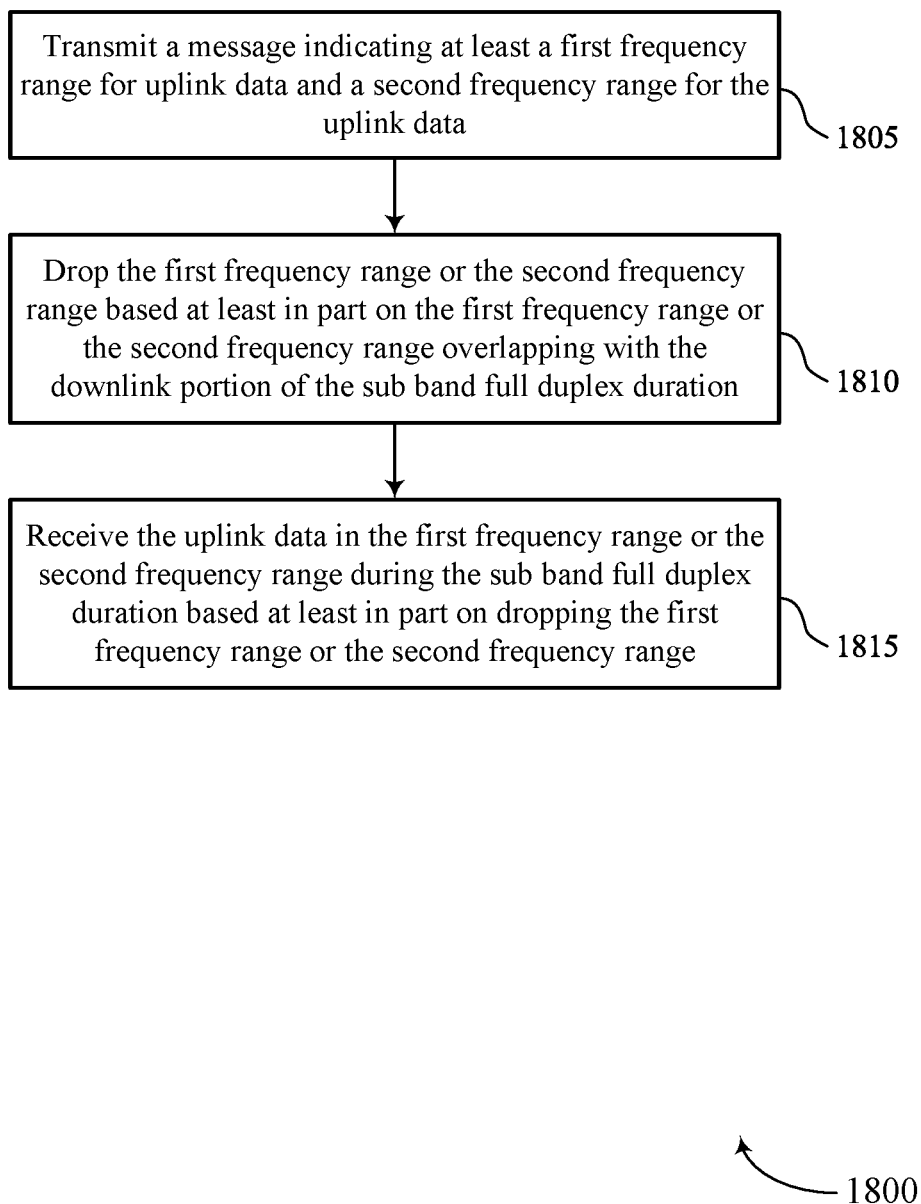

FIG. 18 shows a flowchart illustrating a method 1800 that supports techniques for cyclic frequency hopping in sub-band full duplex slots in accordance with one or more aspects of the present disclosure. The operations of the method 1800 may be implemented by a network node or its components as described herein. For example, the operations of the method 1800 may be performed by a network node as described with reference to FIGS. 1 through 6 and 11 through 14. In some examples, a network node may execute a set of instructions to control the functional elements of the network node to perform the described functions. Additionally, or alternatively, the network node may perform aspects of the described functions using special-purpose hardware.

At 1805, the method may include transmitting a message indicating at least a first frequency range for uplink data and a second frequency range for the uplink data. The operations of 1805 may be performed in accordance with examples as disclosed herein. In some examples, aspects of the operations of 1805 may be performed by an indication transmission component 1325 as described with reference to FIG. 13.

At 1810, the method may include dropping the first frequency range or the second frequency range based on the first frequency range or the second frequency range overlapping with the downlink portion of the sub band full duplex duration. The operations of 1810 may be performed in accordance with examples as disclosed herein. In some examples, aspects of the operations of 1810 may be performed by a frequency drop component 1340 as described with reference to FIG. 13.

At 1815, the method may include receiving the uplink data in the first frequency range or the second frequency range during the sub band full duplex duration based on dropping the first frequency range or the second frequency range. The operations of 1815 may be performed in accordance with examples as disclosed herein. In some examples, aspects of the operations of 1815 may be performed by an uplink reception component 1335 as described with reference to FIG. 13.

At 1820, the method may include applying a frequency offset for at least one of the first frequency range or the second frequency range based on the first frequency range, the second frequency range, or both, overlapping with a downlink portion of a sub band full duplex duration. The operations of 1820 may be performed in accordance with examples as disclosed herein. In some examples, aspects of the operations of 1820 may be performed by a frequency offset component 1330 as described with reference to FIG. 13.

At 1825, the method may include receiving, during a first portion of the sub band full duplex duration, the uplink data in the first frequency range, the second frequency range, or a third frequency range based on applying the frequency offset for at least one of the first frequency range or the second frequency range. The operations of 1825 may be performed in accordance with examples as disclosed herein. In some examples, aspects of the operations of 1825 may be performed by an uplink reception component 1335 as described with reference to FIG. 13.

The following provides an overview of aspects of the present disclosure:

Aspect 1: A method for wireless communications at a UE, comprising: receiving a message indicating at least a first frequency range for uplink data and a second frequency range for the uplink data; applying a frequency offset for at least one of the first frequency range or the second frequency range based at least in part on the first frequency range, the second frequency range, or both, overlapping with a downlink portion of a sub band full duplex duration; and transmitting, during a first portion of the sub band full duplex duration, the uplink data in the first frequency range, the second frequency range, or a third frequency range based at least in part on applying the frequency offset for at least one of the first frequency range or the second frequency range.

Aspect 2: The method of aspect 1, wherein applying the frequency offset comprises: dropping the first frequency range or the second frequency range based at least in part on the first frequency range or the second frequency range overlapping with the downlink portion of the sub band full duplex duration.

Aspect 3: The method of aspect 2, further comprising: transmitting the uplink data in the first frequency range or the second frequency range during the sub band full duplex duration based at least in part on dropping the first frequency range or the second frequency range.

Aspect 4: The method of any of aspects 1 through 3, wherein applying the frequency offset comprises: applying a difference between the first frequency range and the second frequency range to the first frequency range, the second frequency range, or both; and determining whether the applied difference satisfies a threshold, the threshold indicating that a frequency range associated with applying the difference fails to overlap with the downlink portion of the sub band full duplex duration.

Aspect 5: The method of aspect 4, further comprising: selecting the third frequency range for transmission of the uplink data based at least in part on the applied difference satisfying the threshold.

Aspect 6: The method of any of aspects 4 through 5, further comprising: applying a second difference between the first frequency range and the second frequency range to the first frequency range, the second frequency range, or both, based at least in part on the applied difference failing to satisfy the threshold.

Aspect 7: The method of any of aspects 1 through 6, further comprising: applying the frequency offset to the second frequency range based at least in part on the second frequency range overlapping with the downlink portion of the sub band full duplex duration; or applying the frequency offset to the first frequency range based at least in part on the first frequency range overlapping with the downlink portion of the sub band full duplex duration.

Aspect 8: The method of any of aspects 1 through 7, wherein both the first frequency range and the second frequency range overlap with the downlink portion of the sub band full duplex duration, further comprising: identifying an initial frequency range for the sub band full duplex duration based at least in part on a difference between the first frequency range and an initial index of a duration prior to the sub band full duplex duration, an initial index of the sub band full duplex duration, or both; applying the frequency offset to the second frequency range based at least in part on a difference between the initial frequency range and the second frequency range; and transmitting the uplink data in the initial frequency range and the third frequency range based at least in part on applying the frequency offset.

Aspect 9: The method of any of aspects 1 through 8, further comprising: determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range; and dropping at least the third frequency range based at least in part on the applied frequency offset failing to satisfy the threshold distance.

Aspect 10: The method of any of aspects 1 through 9, wherein receiving the message comprises: receiving the message indicating the third frequency range, a fourth frequency range, or both, for transmission of the uplink data during the sub band full duplex duration.

Aspect 11: A method for wireless communications at a network node, comprising: transmitting a message indicating at least a first frequency range for uplink data and a second frequency range for the uplink data; applying a frequency offset for at least one of the first frequency range or the second frequency range based at least in part on the first frequency range, the second frequency range, or both, overlapping with a downlink portion of a sub band full duplex duration; and receiving, during a first portion of the sub band full duplex duration, the uplink data in the first frequency range, the second frequency range, or a third frequency range based at least in part on applying the frequency offset for at least one of the first frequency range or the second frequency range.

Aspect 12: The method of aspect 11, wherein applying the frequency offset comprises: dropping the first frequency range or the second frequency range based at least in part on the first frequency range or the second frequency range overlapping with the downlink portion of the sub band full duplex duration.

Aspect 13: The method of aspect 12, further comprising: receiving the uplink data in the first frequency range or the second frequency range during the sub band full duplex duration based at least in part on dropping the first frequency range or the second frequency range.

Aspect 14: The method of any of aspects 11 through 13, wherein applying the frequency offset comprises: applying a difference between the first frequency range and the second frequency range to the first frequency range, the second frequency range, or both; and determining whether the applied difference satisfies a threshold, the threshold indicating that a frequency range associated with applying the difference fails to overlap with the downlink portion of the sub band full duplex duration.

Aspect 15: The method of aspect 14, further comprising: selecting the third frequency range for transmission of the uplink data based at least in part on the applied difference satisfying the threshold.

Aspect 16: The method of any of aspects 14 through 15, further comprising: applying a second difference between the first frequency range and the second frequency range to the first frequency range, the second frequency range, or both, based at least in part on the applied difference failing to satisfy the threshold.

Aspect 17: The method of any of aspects 11 through 16, further comprising: applying the frequency offset to the second frequency range based at least in part on the second frequency range overlapping with the downlink portion of the sub band full duplex duration; or applying the frequency offset to the first frequency range based at least in part on the first frequency range overlapping with the downlink portion of the sub band full duplex duration.

Aspect 18: The method of any of aspects 11 through 17, wherein both the first frequency range and the second frequency range overlap with the downlink portion of the sub band full duplex duration, further comprising: identifying an initial frequency range for the sub band full duplex duration based at least in part on a difference between the first frequency range and an initial index of a duration prior to the sub band full duplex duration, an initial index of the sub band full duplex duration, or both; applying the frequency offset to the second frequency range based at least in part on a difference between the initial frequency range and the second frequency range; and receiving the uplink data in the initial frequency range and the third frequency range based at least in part on applying the frequency offset.

Aspect 19: The method of any of aspects 11 through 18, further comprising: determining whether the applied frequency offset satisfies a threshold distance between the first frequency range and the third frequency range or a second threshold distance between the second frequency range and the third frequency range, the third frequency range being a result of applying the frequency offset to the first frequency range or the second frequency range; and dropping at least the third frequency range based at least in part on the applied frequency offset failing to satisfy the threshold distance.

Aspect 20: The method of any of aspects 11 through 19, wherein transmitting the message comprises: transmitting the message indicating the third frequency range, a fourth frequency range, or both, for transmission of the uplink data during the sub band full duplex duration.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a network node, comprising a processor; memory coupled with the processor; and instructions stored in the memory and executable by the processor to cause the apparatus to perform a method of any of aspects 11 through 20.

Aspect 25: An apparatus for wireless communications at a network node, comprising at least one means for performing a method of any of aspects 11 through 20.

Aspect 26: A non-transitory computer-readable medium storing code for wireless communications at a network node, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
  one or more processors;
  memory coupled with the one or more processors; and
  instructions stored in the memory and executable by the one or more processors to cause the apparatus to:
    receive a message indicating at least a first frequency range for uplink data and a second frequency range for the uplink data;
    apply a frequency offset for at least one of the first frequency range or the second frequency range based at least in part on the first frequency range, the second frequency range, or both, overlapping with a downlink portion of a sub band full duplex duration; and
    transmit, during a first portion of the sub band full duplex duration, the uplink data in the first frequency range, the second frequency range, or a third frequency range based at least in part on applying the frequency offset for at least one of the first frequency range or the second frequency range.

2. The apparatus of claim 1, wherein the instructions are further executable by the one or more processors to apply the frequency offset by being executable by the one or more processors to:
drop the first frequency range or the second frequency range based at least in part on the first frequency range or the second frequency range overlapping with the downlink portion of the sub band full duplex duration.

3. The apparatus of claim 2, wherein the instructions are further executable by the one or more processors to cause the apparatus to:
transmit the uplink data in the first frequency range or the second frequency range during the sub band full duplex duration based at least in part on dropping the first frequency range or the second frequency range.

4. The apparatus of claim 1, wherein the instructions are further executable by the one or more processors to apply the frequency offset by being executable by the one or more processors to:
apply a difference between the first frequency range and the second frequency range to the first frequency range, the second frequency range, or both; and
determine whether the applied difference satisfies a threshold, the threshold indicating that a frequency range associated with applying the difference fails to overlap with the downlink portion of the sub band full duplex duration.

5. The apparatus of claim 4, wherein the instructions are further executable by the one or more processors to cause the apparatus to:
select the third frequency range for transmission of the uplink data based at least in part on the applied difference satisfying the threshold.

6. The apparatus of claim 4, wherein the instructions are further executable by the one or more processors to cause the apparatus to:
apply a second difference between the first frequency range and the second frequency range to the first frequency range, the second frequency range, or both, based at least in part on the applied difference failing to satisfy the threshold.

7. The apparatus of claim 1, wherein the instructions are further executable by the one or more processors to cause the apparatus to:
apply the frequency offset to the second frequency range based at least in part on the second frequency range overlapping with the downlink portion of the sub band full duplex duration; or
apply the frequency offset to the first frequency range based at least in part on the first frequency range overlapping with the downlink portion of the sub band full duplex duration.

8. The apparatus of claim 1, wherein the instructions are further executable by the one or more processors to cause the apparatus to:
identify an initial frequency range for the sub band full duplex duration based at least in part on a difference between the first frequency range and an initial index of a duration prior to the sub band full duplex duration, an initial index of the sub band full duplex duration, or both;

apply the frequency offset to the second frequency range based at least in part on a difference between the initial frequency range and the second frequency range; and
transmit the uplink data in the initial frequency range and the third frequency range based at least in part on applying the frequency offset.

9. The apparatus of claim 1, wherein the instructions are further executable by the one or more processors to cause the apparatus to:
determine whether the applied frequency offset satisfies a threshold distance between the first frequency range and the third frequency range or a second threshold distance between the second frequency range and the third frequency range, the third frequency range being a result of applying the frequency offset to the first frequency range or the second frequency range; and
drop at least the third frequency range based at least in part on the applied frequency offset failing to satisfy the threshold distance.

10. The apparatus of claim 1, wherein the instructions are further executable by the one or more processors to receive the message by being executable by the one or more processors to:
cause the apparatus to receive the message indicating the third frequency range, a fourth frequency range, or both, for transmission of the uplink data during the sub band full duplex duration.

11. An apparatus for wireless communications at a network node, comprising:
one or more processors;
memory coupled with the one or more processors; and
instructions stored in the memory and executable by the one or more processors to cause the apparatus to:
transmit a message indicating at least a first frequency range for uplink data and a second frequency range for the uplink data;
apply a frequency offset for at least one of the first frequency range or the second frequency range based at least in part on the first frequency range, the second frequency range, or both, overlapping with a downlink portion of a sub band full duplex duration; and
receive, during a first portion of the sub band full duplex duration, the uplink data in the first frequency range, the second frequency range, or a third frequency range based at least in part on applying the frequency offset for at least one of the first frequency range or the second frequency range.

12. The apparatus of claim 11, wherein the instructions are further executable by the one or more processors to apply the frequency offset by being executable by the one or more processors to:
drop the first frequency range or the second frequency range based at least in part on the first frequency range or the second frequency range overlapping with the downlink portion of the sub band full duplex duration.

13. The apparatus of claim 12, wherein the instructions are further executable by the one or more processors to cause the apparatus to:
transmit the uplink data in the first frequency range or the second frequency range during the sub band full duplex duration based at least in part on dropping the first frequency range or the second frequency range.

14. The apparatus of claim 11, wherein the instructions to apply the frequency offset are executable by the one or more processors to cause the apparatus to:

apply a difference between the first frequency range and the second frequency range to the first frequency range, the second frequency range, or both; and determine whether the applied difference satisfies a threshold, the threshold indicating that a frequency range associated with applying the difference fails to overlap with the downlink portion of the sub band full duplex duration.

15. The apparatus of claim 14, wherein the instructions are further executable by the one or more processors to cause the apparatus to:

select the third frequency range for transmission of the uplink data based at least in part on the applied difference satisfying the threshold.

16. The apparatus of claim 14, wherein the instructions are further executable by the one or more processors to cause the apparatus to:

apply a second difference between the first frequency range and the second frequency range to the first frequency range, the second frequency range, or both, based at least in part on the applied difference failing to satisfy the threshold.

17. The apparatus of claim 11, wherein the instructions are further executable by the one or more processors to cause the apparatus to:

apply the frequency offset to the second frequency range based at least in part on the second frequency range overlapping with the downlink portion of the sub band full duplex duration; or apply the frequency offset to the first frequency range based at least in part on the first frequency range overlapping with the downlink portion of the sub band full duplex duration.

18. The apparatus of claim 11, wherein the instructions are further executable by the one or more processors to cause the apparatus to:

identify an initial frequency range for the sub band full duplex duration based at least in part on a difference between the first frequency range and an initial index of a duration prior to the sub band full duplex duration, an initial index of the sub band full duplex duration, or both;

apply the frequency offset to the second frequency range based at least in part on a difference between the initial frequency range and the second frequency range; and receive the uplink data in the initial frequency range and the third frequency range based at least in part on applying the frequency offset.

19. The apparatus of claim 11, wherein the instructions are further executable by the one or more processors to cause the apparatus to:

determine whether the applied frequency offset satisfies a threshold distance between the first frequency range and the third frequency range or a second threshold distance between the second frequency range and the third frequency range, the third frequency range being a result of applying the frequency offset to the first frequency range or the second frequency range; and drop at least the third frequency range based at least in part on the applied frequency offset failing to satisfy the threshold distance.

20. The apparatus of claim 11, wherein the instructions are further executable by the one or more processors to receive the message by being executable by the one or more processors to:

cause the apparatus to receive the message indicating the third frequency range, a fourth frequency range, or both, for transmission of the uplink data during the sub band full duplex duration.

21. A method for wireless communications at a user equipment (UE), comprising:

receiving a message indicating at least a first frequency range for uplink data and a second frequency range for the uplink data;

applying a frequency offset for at least one of the first frequency range or the second frequency range based at least in part on the first frequency range, the second frequency range, or both, overlapping with a downlink portion of a sub band full duplex duration; and transmitting, during a first portion of the sub band full duplex duration, the uplink data in the first frequency range, the second frequency range, or a third frequency range based at least in part on applying the frequency offset for at least one of the first frequency range or the second frequency range.

22. The method of claim 21, wherein applying the frequency offset comprises:

dropping the first frequency range or the second frequency range based at least in part on the first frequency range or the second frequency range overlapping with the downlink portion of the sub band full duplex duration.

23. The method of claim 22, further comprising:

transmitting the uplink data in the first frequency range or the second frequency range during the sub band full duplex duration based at least in part on dropping the first frequency range or the second frequency range.

24. The method of claim 21, wherein applying the frequency offset comprises:

applying a difference between the first frequency range and the second frequency range to the first frequency range, the second frequency range, or both; and determining whether the applied difference satisfies a threshold, the threshold indicating that a frequency range associated with applying the difference fails to overlap with the downlink portion of the sub band full duplex duration.

25. The method of claim 24, further comprising:

selecting the third frequency range for transmission of the uplink data based at least in part on the applied difference satisfying the threshold.

26. A method for wireless communications at a network node, comprising:

transmitting a message indicating at least a first frequency range for uplink data and a second frequency range for the uplink data;

applying a frequency offset for at least one of the first frequency range or the second frequency range based at least in part on the first frequency range, the second frequency range, or both, overlapping with a downlink portion of a sub band full duplex duration; and receiving, during a first portion of the sub band full duplex duration, the uplink data in the first frequency range, the second frequency range, or a third frequency range based at least in part on applying the frequency offset for at least one of the first frequency range or the second frequency range.

27. The method of claim 26, wherein applying the frequency offset comprises:

dropping the first frequency range or the second frequency range based at least in part on the first frequency range or the second frequency range overlapping with the downlink portion of the sub band full duplex duration.

28. The method of claim 27, further comprising:
receiving the uplink data in the first frequency range or the second frequency range during the sub band full duplex duration based at least in part on dropping the first frequency range or the second frequency range.

29. The method of claim 26, wherein applying the frequency offset comprises:
applying a difference between the first frequency range and the second frequency range to the first frequency range, the second frequency range, or both; and
determining whether the applied difference satisfies a threshold, the threshold indicating that a frequency range associated with applying the difference fails to overlap with the downlink portion of the sub band full duplex duration.

30. The method of claim 29, further comprising:
selecting the third frequency range for transmission of the uplink data based at least in part on the applied difference satisfying the threshold.

* * * * *